US012681123B2

(12) United States Patent
Balasubramanian et al.

(10) Patent No.: US 12,681,123 B2
(45) Date of Patent: Jul. 14, 2026

(54) METHODS FOR CLOUD BASED LOCATION VERIFICATION FOR VEHICLE-TO-EVERYTHING (V2X) SYSTEMS

(71) Applicant: QUALCOMM Incorporated, San Diego, CA (US)

(72) Inventors: Anantharaman Balasubramanian, San Diego, CA (US); Shuanshuan Wu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 866 days.

(21) Appl. No.: 17/938,853

(22) Filed: Oct. 7, 2022

(65) Prior Publication Data

US 2024/0118364 A1 Apr. 11, 2024

(51) Int. Cl.
*G01S 5/00* (2006.01)
*H04W 24/08* (2009.01)

(52) U.S. Cl.
CPC ........... *G01S 5/0036* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,671,785 B1 * | 6/2017 | Bhatia | ............... | B60W 30/0956 |
| 9,875,589 B1 * | 1/2018 | Buttolo | .............. | G07C 9/00571 |
| 10,805,402 B1 * | 10/2020 | Whitman | ............ | H04W 12/104 |
| 2015/0282115 A1 * | 10/2015 | Pitt | ..................... | H04W 64/006 |
| | | | | 455/456.1 |
| 2020/0065499 A1 * | 2/2020 | Hampton | .............. | H04L 9/0872 |

FOREIGN PATENT DOCUMENTS

WO WO-2019229941 A1 * 12/2019 ........... H04W 64/00

* cited by examiner

*Primary Examiner* — Adolf Dsouza
(74) *Attorney, Agent, or Firm* — Holland & Hart LLP

(57) ABSTRACT

Methods, systems, and devices for wireless communications are described. A server may request sensed location information from a first device to verify location information reported by the first device or one or more additional devices. For example, a first user equipment (UE) may receive a message requesting sensed location information for verification of the location information associated with and reported by the first UE. Based on a sensing procedure performed by the first UE, the first UE may transmit a report indicating the sensed location information and a sensing time. In another example, a first device may receive a message requesting sensed location information for verification of the location information associated with and reported by one or more additional devices. Based on a sensing procedure performed by the first UE, the first UE may transmit a report indicating the sensed location information and the sensing time.

30 Claims, 22 Drawing Sheets

105-a 125-a 125-c 205-a 215-a 220-a 115-a 210-a 125-b 105-b

200

220-c

515

520

505

510

525

115-e 115-f 105-c

500

405-c 405-d 115-h

Figure 8:
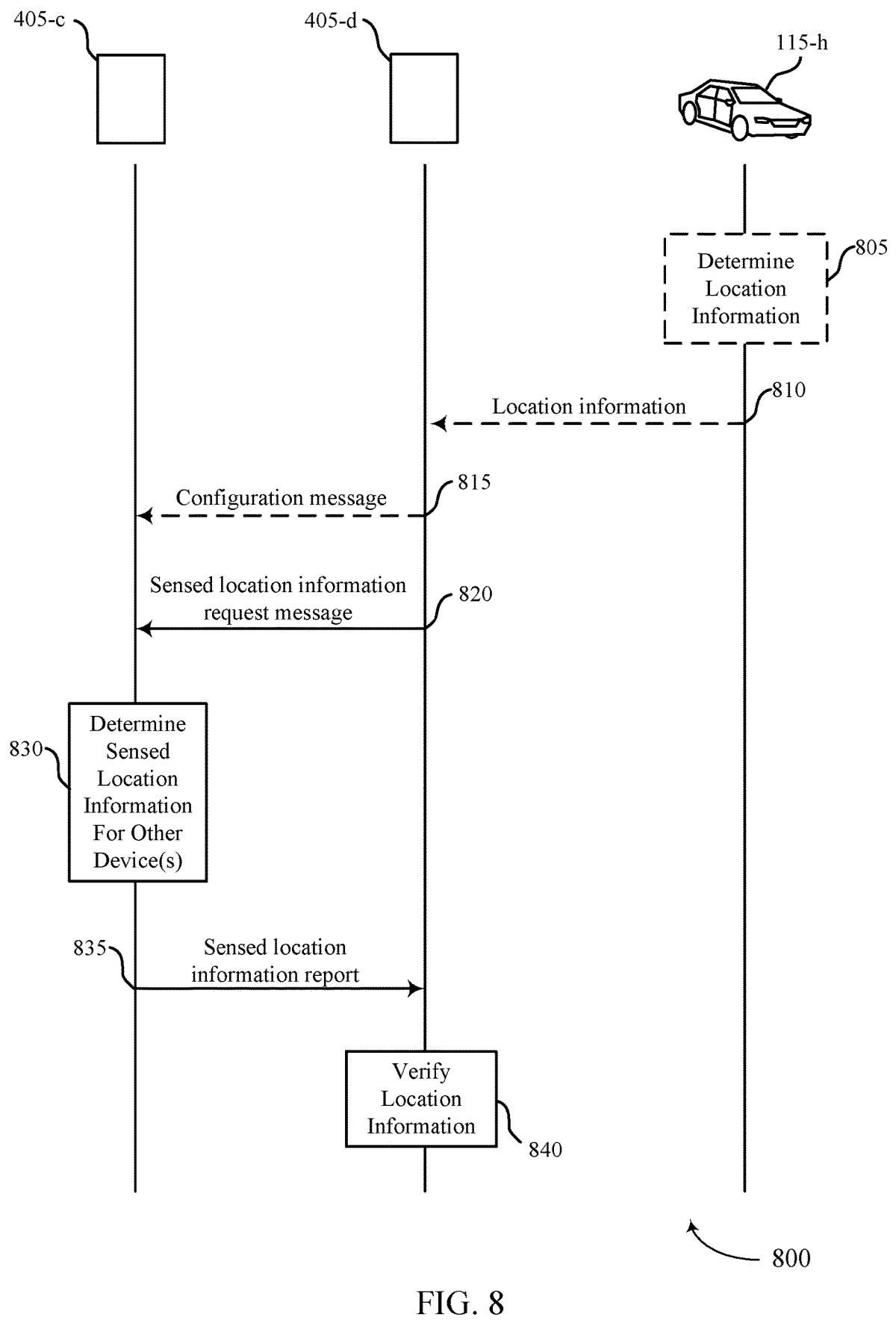

Determine
Location
Information  805

Location information  810

Configuration message  815

Sensed location information
request message  820

Determine
Sensed
Location
Information
For Other
Device(s)  830

Sensed location
information report  835

Verify
Location
Information  840

Network
Entity

Transceiver

1610

Antenna

1615

Communications
Manager

1620

Memory

Code

1630

1625

1640

Processor

1635

1605

1600

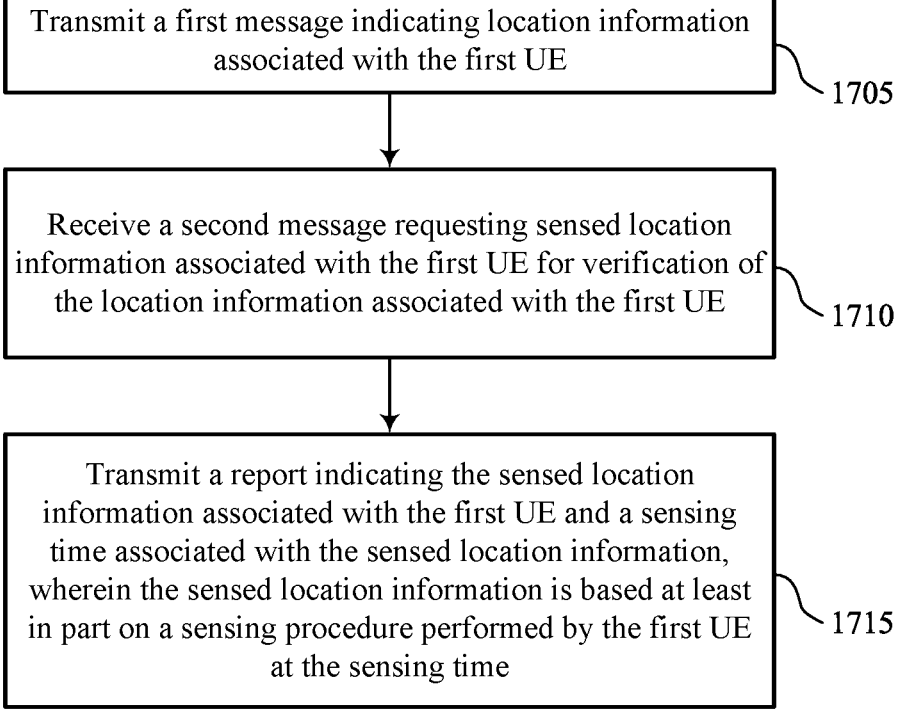

Transmit a first message indicating location information associated with the first UE

1705

Receive a second message requesting sensed location information associated with the first UE for verification of the location information associated with the first UE

1710

Transmit a report indicating the sensed location information associated with the first UE and a sensing time associated with the sensed location information, wherein the sensed location information is based at least in part on a sensing procedure performed by the first UE at the sensing time

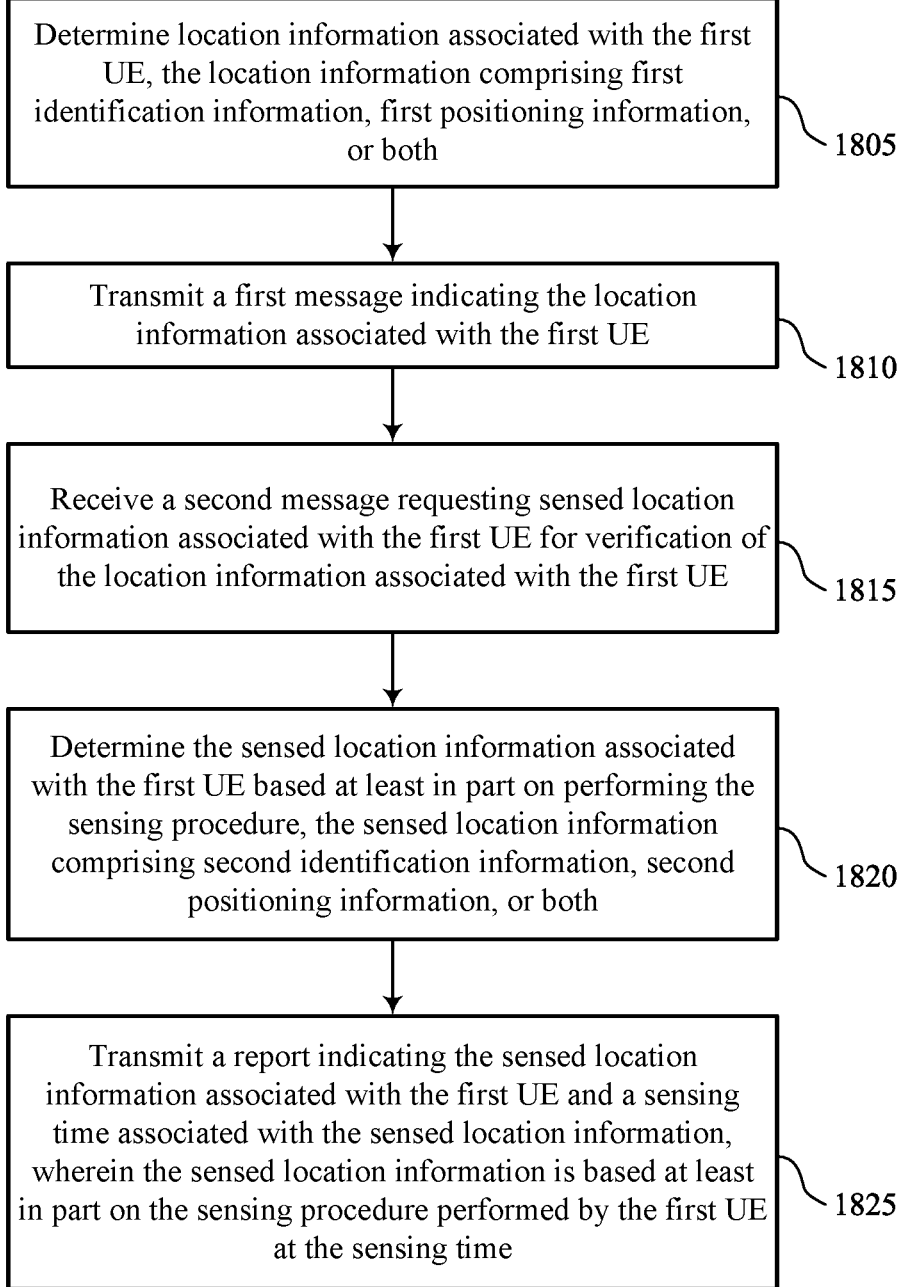

Determine location information associated with the first UE, the location information comprising first identification information, first positioning information, or both

⤷ 1805

Transmit a first message indicating the location information associated with the first UE

⤷ 1810

Receive a second message requesting sensed location information associated with the first UE for verification of the location information associated with the first UE

⤷ 1815

Determine the sensed location information associated with the first UE based at least in part on performing the sensing procedure, the sensed location information comprising second identification information, second positioning information, or both

⤷ 1820

Transmit a report indicating the sensed location information associated with the first UE and a sensing time associated with the sensed location information, wherein the sensed location information is based at least in part on the sensing procedure performed by the first UE at the sensing time

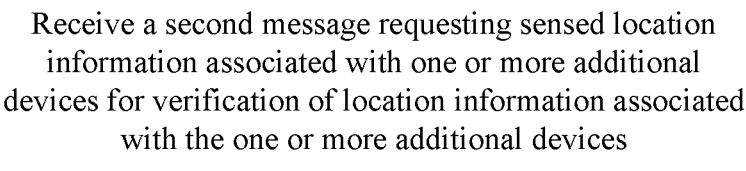

Receive a second message requesting sensed location information associated with one or more additional devices for verification of location information associated with the one or more additional devices        1905

Transmit a report indicating the sensed location information associated with the one or more additional devices and a sensing time associated with the sensed location information, wherein the sensed location information is based at least in part on a sensing procedure performed by the device at the sensing time        1910

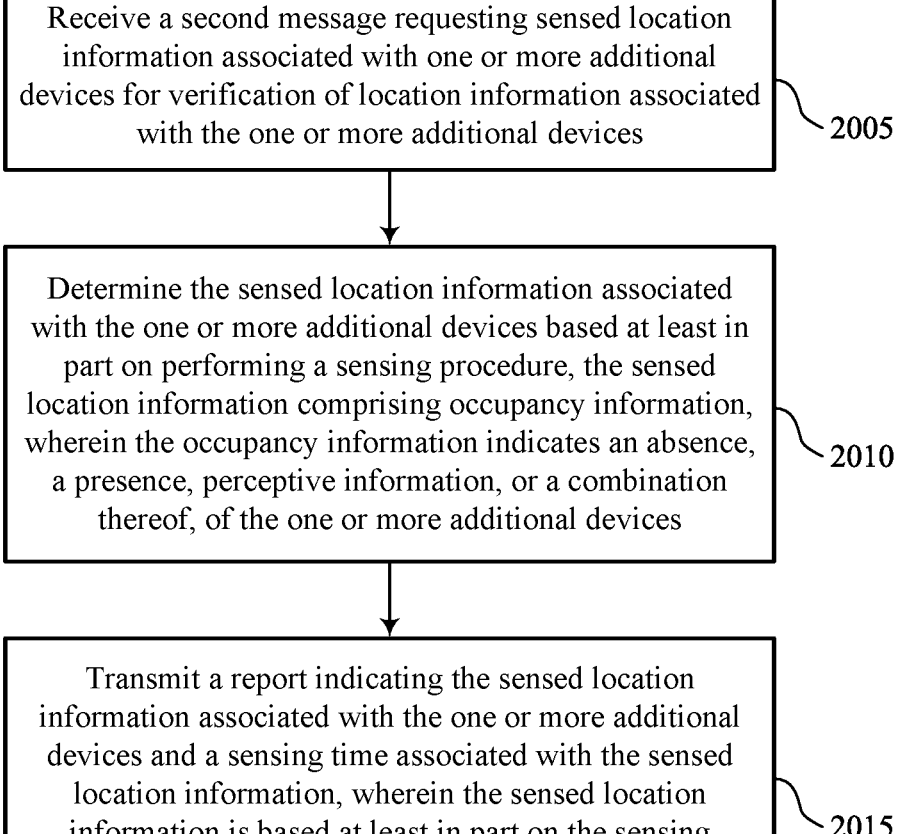

Receive a second message requesting sensed location information associated with one or more additional devices for verification of location information associated with the one or more additional devices

2005

Determine the sensed location information associated with the one or more additional devices based at least in part on performing a sensing procedure, the sensed location information comprising occupancy information, wherein the occupancy information indicates an absence, a presence, perceptive information, or a combination thereof, of the one or more additional devices

2010

Transmit a report indicating the sensed location information associated with the one or more additional devices and a sensing time associated with the sensed location information, wherein the sensed location information is based at least in part on the sensing procedure performed by the device at the sensing time

Receive a first message indicating location information associated a first UE

⌐2105

Transmit a second message requesting sensed location information for verification of the location information associated with the first UE

⌐2110

Receive a report indicating the sensed location information and a sensing time associated with the sensed location information

⌐2115

2100

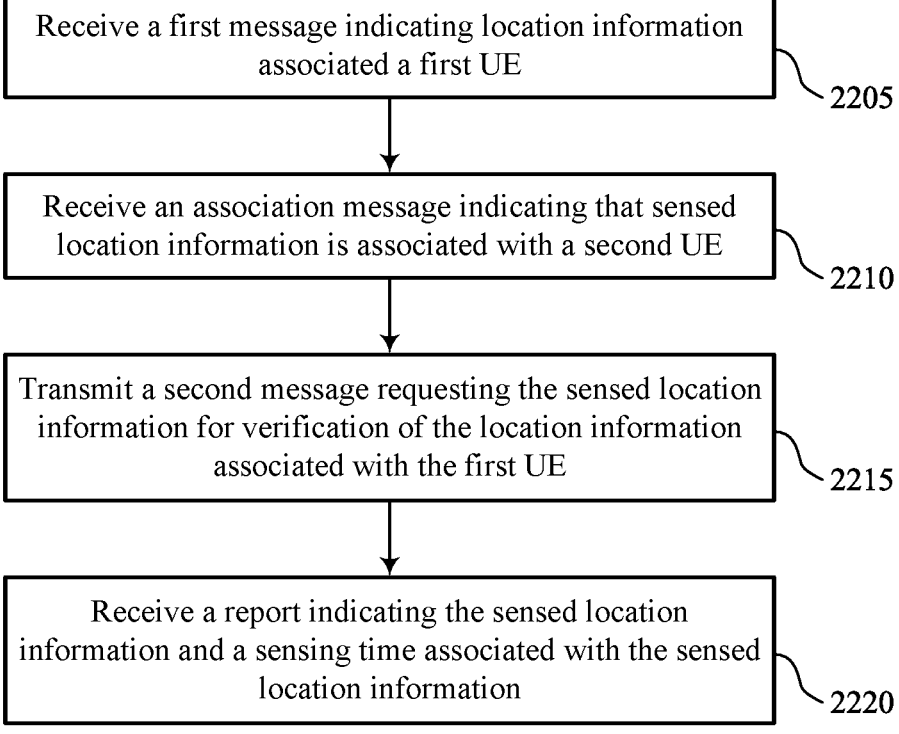

Receive a first message indicating location information associated a first UE

2205

Receive an association message indicating that sensed location information is associated with a second UE

2210

Transmit a second message requesting the sensed location information for verification of the location information associated with the first UE

2215

Receive a report indicating the sensed location information and a sensing time associated with the sensed location information

METHODS FOR CLOUD BASED LOCATION VERIFICATION FOR VEHICLE-TO-EVERYTHING (V2X) SYSTEMS

FIELD OF TECHNOLOGY

The following relates to wireless communications, including methods for cloud based location verification for vehicle-to-everything (V2X) systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support methods for cloud based location verification for vehicle-to-everything (V2X) systems. Generally, the described techniques provide for a device (e.g., a user equipment (UE), a network entity, or a roadside unit (RSU)) to report sensed location information and a sensing time associated with the obtained sensed location information such that a server is able to provide location information verification based on receiving the sensed location information and the sensing time.

In some cases, a first UE (e.g., a vehicular UE) may maliciously or unintentionally spoof its position. For example, a first UE may transmit a first message indicating location information associated with the first UE, where the location information may be associated with various levels of reliability. In some implementations, a server may determine the reliability of the location information reported by the first UE based on a sensing procedure performed at the first UE. For instance, the first UE that transmitted the location information may receive a second message requesting sensed location information associated with the first UE for verification of the location information associated with the first UE. Accordingly, the first UE may perform a sensing procedure at a sensing time, and the first UE may transmit a report indicating the sensed location information associated with the first UE and the sensing time based on performing the sensing procedure.

In some other implementations, a server may determine the reliability of the location information reported by one or more additional devices based on a sensing procedure performed at a first device. For instance, the first device (e.g., a trusted UE, a network entity, an RSU, etc.) may receive a message requesting sensed location information associated with one or more additional devices (e.g., a vehicular UE) for verification of the location information associated with the one or more additional devices (e.g., the vehicular UE). Accordingly, the first device may perform a sensing procedure at a sensing time, and the first device may transmit a report indicating the sensed location information associated with the one or more additional devices and the sensing time based one performing the sensing procedure.

A method for wireless communication at a first UE is described. The method may include transmitting a first message indicating location information associated with the first UE, receiving a second message requesting sensed location information associated with the first UE for verification of the location information associated with the first UE, and transmitting a report indicating the sensed location information associated with the first UE and a sensing time associated with the sensed location information, where the sensed location information is based on a sensing procedure performed by the first UE at the sensing time.

An apparatus for wireless communication at a first UE is described. The apparatus may include a processor, memory coupled with the processor, and instructions stored in the memory. The instructions may be executable by the processor to cause the apparatus to transmit a first message indicating location information associated with the first UE, receive a second message requesting sensed location information associated with the first UE for verification of the location information associated with the first UE, and transmit a report indicating the sensed location information associated with the first UE and a sensing time associated with the sensed location information, where the sensed location information is based on a sensing procedure performed by the first UE at the sensing time.

Another apparatus for wireless communication at a first UE is described. The apparatus may include means for transmitting a first message indicating location information associated with the first UE, means for receiving a second message requesting sensed location information associated with the first UE for verification of the location information associated with the first UE, and means for transmitting a report indicating the sensed location information associated with the first UE and a sensing time associated with the sensed location information, where the sensed location information is based on a sensing procedure performed by the first UE at the sensing time.

A non-transitory computer-readable medium storing code for wireless communication at a first UE is described. The code may include instructions executable by a processor to transmit a first message indicating location information associated with the first UE, receive a second message requesting sensed location information associated with the first UE for verification of the location information associated with the first UE, and transmit a report indicating the sensed location information associated with the first UE and a sensing time associated with the sensed location information, where the sensed location information is based on a sensing procedure performed by the first UE at the sensing time.

Some examples of the method, apparatuses, and non-transitory computer-readable medium described herein may further include operations, features, means, or instructions for performing the sensing procedure to obtain the sensed location information based on monitoring for the sensed location information using one or more sensors at the first UE.

In some examples of the method, apparatuses, and non-transitory computer-readable medium described herein, monitoring for the sensed location information may include operations, features, means, or instructions for receiving an identification indication associated with one or more additional devices, where the identification indication may be received based on an operating status of the one or more additional devices.

In some examples of the method, apparatuses, and non-transitory computer-readable medium described herein, monitoring for the sensed location information may include operations, features, means, or instructions for receiving a configuration message indicating a set of one or more additional devices to be used for the verification of the location information associated with the first UE and monitoring a subset of the set of one or more additional devices based on a location of the first UE.

Some examples of the method, apparatuses, and non-transitory computer-readable medium described herein may further include operations, features, means, or instructions for receiving a configuration message indicating a mapping relationship between a bitmap parameter and one or more additional devices, where each bit of the bitmap parameter may be associated with a respective device of the one or more additional devices.

In some examples of the method, apparatuses, and non-transitory computer-readable medium described herein, transmitting the report indicating the sensed location information may include operations, features, means, or instructions for transmitting the bitmap parameter, where each bit of the bitmap parameter indicates an operation status, an observability status, an identification, or a combination thereof, of the respective device of the one or more additional devices.

Some examples of the method, apparatuses, and non-transitory computer-readable medium described herein may further include operations, features, means, or instructions for determining the location information associated with the first UE, the location information including first identification information, first positioning information, or both and determining the sensed location information associated with the first UE based on performing the sensing procedure, the sensed location information including second identification information, second positioning information, or both.

In some examples of the method, apparatuses, and non-transitory computer-readable medium described herein, the second message requests additional sensed location information associated with one or more additional UEs and the method, apparatuses, and non-transitory computer-readable medium may include further operations, features, means, or instructions for performing the sensing procedure to obtain the additional sensed location information, where the report indicates the additional sensed location information.

In some examples of the method, apparatuses, and non-transitory computer-readable medium described herein, the sensed location information may be associated with a second UE.

A method for wireless communication at a device is described. The method may include receiving a first message requesting sensed location information associated with one or more additional devices for verification of location information associated with the one or more additional devices and transmitting a report indicating the sensed location information associated with the one or more additional devices and a sensing time associated with the sensed location information, where the sensed location information is based on a sensing procedure performed by the device at the sensing time.

An apparatus for wireless communication at a device is described. The apparatus may include a processor, memory coupled with the processor, and instructions stored in the memory. The instructions may be executable by the processor to cause the apparatus to receive a first message requesting sensed location information associated with one or more additional devices for verification of location information associated with the one or more additional devices and transmit a report indicating the sensed location information associated with the one or more additional devices and a sensing time associated with the sensed location information, where the sensed location information is based on a sensing procedure performed by the device at the sensing time.

Another apparatus for wireless communication at a device is described. The apparatus may include means for receiving a first message requesting sensed location information associated with one or more additional devices for verification of location information associated with the one or more additional devices and means for transmitting a report indicating the sensed location information associated with the one or more additional devices and a sensing time associated with the sensed location information, where the sensed location information is based on a sensing procedure performed by the device at the sensing time.

A non-transitory computer-readable medium storing code for wireless communication at a device is described. The code may include instructions executable by a processor to receive a first message requesting sensed location information associated with one or more additional devices for verification of location information associated with the one or more additional devices and transmit a report indicating the sensed location information associated with the one or more additional devices and a sensing time associated with the sensed location information, where the sensed location information is based on a sensing procedure performed by the device at the sensing time.

Some examples of the method, apparatuses, and non-transitory computer-readable medium described herein may further include operations, features, means, or instructions for receiving a configuration message indicating a geographical zone corresponding to a predefined area, one or more respective perceptive identifiers associated with the one or more additional devices, or both.

Some examples of the method, apparatuses, and non-transitory computer-readable medium described herein may further include operations, features, means, or instructions for monitoring for the one or more additional devices at the sensing time using one or more sensors at the device based on the geographical zone.

Some examples of the method, apparatuses, and non-transitory computer-readable medium described herein may further include operations, features, means, or instructions for monitoring for perceptive information at the sensing time in accordance with the one or more respective perceptive identifiers based on receiving the first message and transmitting the report indicating an identification associated with the one or more additional devices based on mapping the perceptive information to the identification associated with the one or more additional devices.

Some examples of the method, apparatuses, and non-transitory computer-readable medium described herein may further include operations, features, means, or instructions for determining the sensed location information associated with the one or more additional devices based on performing the sensing procedure, the sensed location information including occupancy information, where the occupancy information indicates an absence, a presence, perceptive information, or a combination thereof, of the one or more additional devices.

In some examples of the method, apparatuses, and non-transitory computer-readable medium described herein, the device may be one of a UE, a base station, a network entity, or an RSU.

A method for wireless communication at a server is described. The method may include receiving a first message indicating location information associated a first UE, transmitting a second message requesting sensed location information for verification of the location information associated with the first UE, and receiving a report indicating the sensed location information and a sensing time associated with the sensed location information.

An apparatus for wireless communication at a server is described. The apparatus may include a processor, memory coupled with the processor, and instructions stored in the memory. The instructions may be executable by the processor to cause the apparatus to receive a first message indicating location information associated a first UE, transmit a second message requesting sensed location information for verification of the location information associated with the first UE, and receive a report indicating the sensed location information and a sensing time associated with the sensed location information.

Another apparatus for wireless communication at a server is described. The apparatus may include means for receiving a first message indicating location information associated a first UE, means for transmitting a second message requesting sensed location information for verification of the location information associated with the first UE, and means for receiving a report indicating the sensed location information and a sensing time associated with the sensed location information.

A non-transitory computer-readable medium storing code for wireless communication at a server is described. The code may include instructions executable by a processor to receive a first message indicating location information associated a first UE, transmit a second message requesting sensed location information for verification of the location information associated with the first UE, and receive a report indicating the sensed location information and a sensing time associated with the sensed location information.

Some examples of the method, apparatuses, and non-transitory computer-readable medium described herein may further include operations, features, means, or instructions for transmitting a first control message triggering a first operation status of one or more additional devices at a first time and transmitting a second control message triggering a second operation status of the one or more additional devices at a second time.

Some examples of the method, apparatuses, and non-transitory computer-readable medium described herein may further include operations, features, means, or instructions for transmitting a configuration message indicating a mapping relationship between a bitmap parameter and one or more additional devices, where each bit of the bitmap parameter may be associated with a respective device of the one or more additional devices.

In some examples of the method, apparatuses, and non-transitory computer-readable medium described herein, receiving the report indicating the sensed location information may include operations, features, means, or instructions for receiving the bitmap parameter, where each bit of the bitmap parameter indicates an operation status, a observability status, an identification, or both, of a respective device of the one or more additional devices.

In some examples of the method, apparatuses, and non-transitory computer-readable medium described herein, receiving the first message may include operations, features, means, or instructions for receiving the first message indicating the location information associated with the first UE, the location information including first identification information, first positioning information, or both.

In some examples of the method, apparatuses, and non-transitory computer-readable medium described herein, transmitting the second message may include operations, features, means, or instructions for transmitting the second message requesting the sensed location information, the sensed location information including occupancy information of one or more additional UEs.

In some examples of the method, apparatuses, and non-transitory computer-readable medium described herein, the occupancy information indicates an absence in a geographical zone, a presence in the geographical zone, perceptive information, or a combination thereof, of the one or more additional UEs.

Some examples of the method, apparatuses, and non-transitory computer-readable medium described herein may further include operations, features, means, or instructions for transmitting a configuration message indicating a geographical zone corresponding to a predefined area, one or more perceptive identifiers associated one or more additional UEs, or both.

Some examples of the method, apparatuses, and non-transitory computer-readable medium described herein may further include operations, features, means, or instructions for transmitting a configuration message indicating a set of one or more additional devices to be used for the verification of the location information associated with the first UE.

In some examples of the method, apparatuses, and non-transitory computer-readable medium described herein, the second message requests additional sensed location information associated with one or more additional UEs, and the report indicates the additional sensed location information.

Some examples of the method, apparatuses, and non-transitory computer-readable medium described herein may further include operations, features, means, or instructions for receiving an association message indicating that the sensed location information may be associated with a second UE.

Some examples of the method, apparatuses, and non-transitory computer-readable medium described herein may further include operations, features, means, or instructions for transmitting a verification message indicating a reliability level of the location information based on the sensed location information satisfying a threshold.

BRIEF DESCRIPTION OF THE DRAWINGS

FIG. 8 illustrates an example of a process flow that supports methods for cloud based location verification for V2X systems in accordance with one or more aspects of the present disclosure.

FIGS. 17 through 22 show flowcharts illustrating methods that support methods for cloud based location verification for V2X systems in accordance with one or more aspects of the present disclosure.

DETAILED DESCRIPTION

Figure 1:
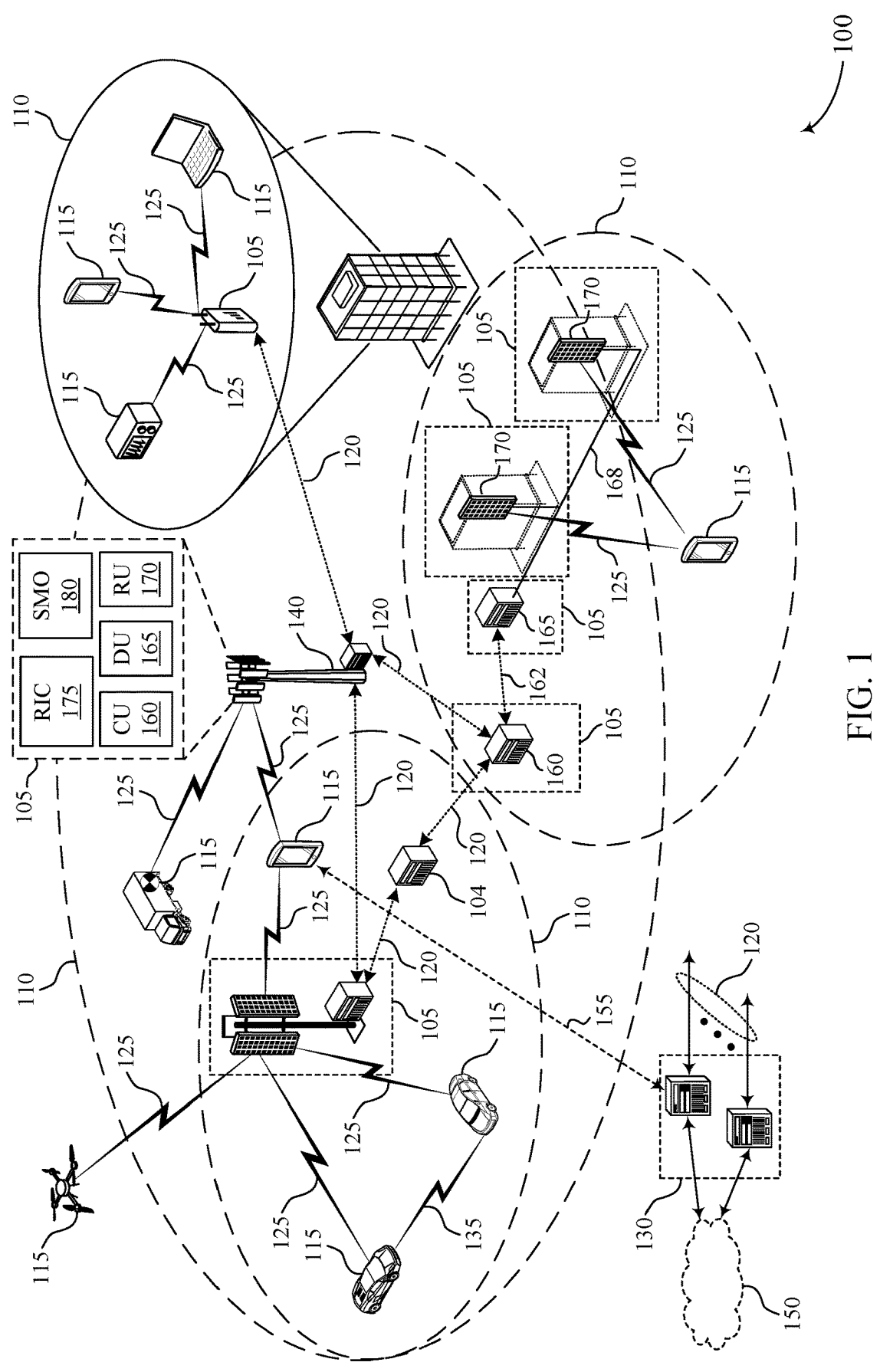
FIG. 1 illustrates an example of a wireless communications system that supports methods for cloud based location verification for vehicle-to-everything (V2X) systems in accordance with one or more aspects of the present disclosure.

Some wireless communication systems may support wireless devices by establishing an access link (e.g., a Uu interface), a sidelink (e.g., a PC5 interface), or both. For example, a user equipment (UE) may establish an access link with a network entity (e.g., a base station, a roadside unit (RSU)) and a sidelink (e.g., a sidelink communication link) with another UE. In some cases, a UE may establish an access link with a network entity and may establish a sidelink with another UE which may operate as a relay (e.g., which has an access link with the same or different base station as the UE) such that the UE may communicate with a network via the access link or the sidelink, or both. In other cases, a UE may only support sidelink communications and may not have capabilities to communicate directly with the network (e.g., via the Uu interface). Sidelink communications may be referred to as vehicle-to-vehicle (V2V) communications, vehicle-to-everything (V2X) communications, device-to-device (D2D) communications, or other terminology.

Location is one type of data consumed by devices of a wireless communications system. For instance, a UE, which may be an example of a vehicle (e.g., a V2X-capable UE), may determine its location using various positioning schemes, procedures, methods, or the like. The location of the UE and other devices may be used in various applications and scenarios, particularly those related to safety. For example, the UE (e.g., a vehicle) may determine the location of one or more other nearby vehicles and/or pedestrians (e.g., carrying personal UEs) to ensure that the UE may safely operate. Devices of a wireless communications system may rely on relatively accurate positioning (e.g., within some threshold) to meet safety requirements associated with the operation of the devices (e.g., to avoid collisions with other vehicles, pedestrians, buildings), among other applications.

In some cases, however, a UE may intentionally or unintentionally contribute to location spoofing by reporting an incorrect location. For instance, a UE may maliciously falsify its location to degrade V2X system safety. Alternatively, a UE may report an incorrect location due to global positioning system (GPS) location uncertainty (e.g., from faulty sensors at the UE). As a result of location spoofing by UEs, original equipment manufacturers (OEMs) which receive location information from the UEs may be unable to determine the level of trust that can be associated with the reported location information. Thus, safe operation of devices in a wireless communication system may be jeopardized by the unknown trustability of location information reported by UEs.

As described herein, a server may provide verification of reported location information based on receiving sensed location information and a sensing time from a device capable of performing a sensing procedure. For instance, in some implementations, a first UE that reports its own location information may receive a message requesting sensed location information associated with the first UE for verification of the location information reported by the first UE. Accordingly, the first UE may perform a sensing procedure at a sensing time using sensors at the first UE. Based on performing the sensing procedure, the first UE may transmit a report indicating the sensed location information associated with the first UE. The sensed location information may indicate an identification, a location, or both, of the first UE and may be determined according to the sensing procedure executed by the first UE. By receiving the sensed location information and the sensing time, the server may indicate a reliability level of the location information reported by the first UE, enhancing safety for the wireless communications system.

In some other implementations, a server may determine the reliability of the location information reported by one or more additional devices based on a sensing procedure performed at a device. For instance, a first device (e.g., a RSU, a network entity, or a trusted UE) may receive a message requesting sensed location information associated with one or more additional devices for verification of location information reported by one or more additional devices. Accordingly, the first device may perform a sensing procedure at a sensing time using sensors at the first device. Based on performing the sensing procedure, the first device may transmit a report indicating the sensed location information associated with the one or more additional devices and the sensing time. The sensed location information may indicate an absence, a presence, perceptive information, or any combination thereof, of the one or more additional devices. By receiving the sensed location information and the sensing time, the server may indicate a reliability level of the location information reported by one or more additional devices, enhancing safety for the wireless communications system.

Aspects of the disclosure are initially described in the context of wireless communications systems. Aspects of the disclosure are further illustrated by and described with reference to process flows, apparatus diagrams, system diagrams, and flowcharts that relate to methods for cloud based location verification for V2X systems.

FIG. 1 illustrates an example of a wireless communications system 100 that supports methods for cloud based location verification for V2X systems in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support methods for cloud based location verification for V2X systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSUs, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In the wireless communications system 100, a UE 115 (e.g., a vehicle UE 115, a UE 115 that supports V2X, a UE 115 that supports sidelink communications) may intentionally (or unintentionally) spoof its position and transmit a basic safety message (BSM) message indicating its spoofed position. One or more UEs 115 may consume location information to obtain updated situational awareness within the wireless communications system 100. Accordingly, the UE 115 that intentionally spoofs its position behaves maliciously to degrade V2X system safety. Additionally, or alternatively, in the wireless communications system 100, a UE 115 may unintentionally spoof its position for non-malicious reasons. For example, high location uncertainty can cause a UE 115 to report incorrect location information.

When a device (e.g., an OEM) in the wireless communications system 100 receives V2X messages which include positioning information, the device may not be aware of the trustability (e.g., reliability) associated with the received positioning information. As such, the device may not know whether the positioning information within the V2X messages can be exploited by a UE 115 to trigger various operations (e.g., notify a driver of the presence of a second UE 115, trigger a higher level of automation, etc.). It may be desirable for devices of the wireless communications system 100 to assess the trustability of positioning information within the V2X messages so that the devices may decide how to use the positioning information in their system architecture.

The wireless communications system 100 may support techniques for a UE 115 to report sensed location information and an associated sensing time to perform techniques for cloud based location verification for V2X systems. In some examples, the wireless communications system 100 may include a server (e.g., a car-to-cloud (C2C) service). The server may intend to verify the location reported by other UEs 115 before relaying the reported location to other UEs 115 in the wireless communications system 100. For example, a C2C server may be connected to a UE 115 through Uu, RSU, or both. The C2C server may provide location verification as a service to the UEs 115. For example, a UE 115 may subscribe to the location verification service provided by the C2C server, ensuring that the C2C server is able to provide a level of trust on location information exchanged amongst devices of the wireless communications system 100.

As such, the UEs 115 may transmit BSM messages containing locations respective to the UEs, where the locations are obtained by the UEs 115 using GPS and other inertial measurement unit (IMU) sensors. However, any of the UEs 115 may be a rogue UE 115 intentionally falsifying its location before transmitting its location to other UEs 115. Additionally, or alternatively, the UEs 115 may provide incorrect location information due to faulty IMU sensors or obstacles within the environment (e.g., obstacles obstructing the IMU sensors, sensing distance limitations, etc.). Accordingly, the C2C server may reinforce the trust on the reported location before data (e.g., the reported location) is consumed by other UEs 115.

The server may deploy different levels of location verification based on receiving sensed location information from one or more devices in the wireless communications system 100. For example, a first UE 115 may transmit a first message indicating its location (e.g., position), where the reported location may be maliciously or unintentionally spoofed. In some examples, the first UE 115 may receive a second message requesting sensed location information for the first UE, where the sensed location information may be used to verify the location information reported by the first UE 115 in the first message. Accordingly, the first UE 115 may perform a sensing procedure at a sensing time, and the first UE 115 may transmit a report indicating the sensed location information and the sensing time. In some other examples, a trusted device (e.g., a network entity 105, a RSU 105, a UE 115, etc.) may receive a message requesting sensed location information that is associated with one or more additional devices (e.g., the first UE 115), where the sensed location information may be used to verify location information associated with and reported by the one or more additional devices (e.g., reported by the first UE 115). Accordingly, the trusted device may perform a sensing procedure at a sensing time, and the trusted device may transmit a report indicating the sensed location information and the sensing time.

Figure 2:
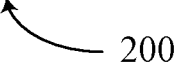
FIG. 2 illustrates an example of a wireless communications system that supports methods for cloud based location verification for V2X systems in accordance with one or more aspects of the present disclosure.

FIG. 2 illustrates an example of a wireless communications system 200 that supports methods for cloud based location verification for V2X systems in accordance with one or more aspects of the present disclosure. The wireless communications system 200 may implement or be implemented by aspects of the wireless communications system 100 as described with reference to FIG. 1. For example, the wireless communications system 200 may include network entity 105-a and UE 115-a, which may be examples of a network entity 105 and a UE 115-a, or any other devices, as described herein. The wireless communications system 200 may support methods for proving the authenticity of location information reported by a UE 115-a or one or more additional devices based on a sensing procedure performed at the UE 115-a, enhancing safety and coordination of devices within the wireless communications system 200. Although FIG. 2 illustrates UE 115-a communicating with network entity 105-a, a server 220-a, and a RSU 105-b, it may be understood that UE 115-a may communicate similarly with other devices in the wireless communications system 200.

As shown, UE 115-a may communicate with network entity 105-a via communication link 125-a and may communicate with RSU 105-b via communication link 125-b. Network entity 105-a may communicate with server 220-a via communication link 125-c.

The wireless communications system 200 may support UEs 115 (e.g., UE 115-a) which have sidelink communication capabilities, network (e.g., Uu) communication capabilities, or both. For example, a UE 115-a may communicate with other UEs 115 via sidelink communication links. Additionally, or alternatively, the UE 115-a may communicate with a network (e.g., via a network entity 105-a, via a RSU 105-b, via a server 220-a) over a network interface (e.g., Uu).

The server 220-a in the wireless communications system 200 may include an autonomous system that is able to verify the authenticity of locations or location information reported by UEs 115, such as the UE 115-a. In some examples, the server 220-a may be a cloud based system.

For example, the UE 115-a may determine its personal location information, where the location information may include the identity indicated by UE 115-a (e.g., first identification information), the location indicated by UE 115-a (e.g., first positioning information), or both. The UE 115-a may transmit a message 205-a (e.g., a first message) indicating the location information associated with the UE 115-a. In some cases, the UE 115-a may intentionally or unintentionally spoof its location information. For this reason, the server 220-a may request proof that the reported location, identify, or both, of the UE 115-a is accurate.

In some examples, the server 220-a may request proof of the location information provided by the UE 115-a by requesting sensed location information from the UE 115-a. The sensed location information requested by the server 220-a may include a detected identity (e.g., second identification information), a detected location (e.g., second positioning information), or both, where the detected identify, the detected location, or both, may be obtained by the UE 115-a via a sensing procedure. For instance, the UE 115-a may receive, from the server 220-a, a message 210-a (e.g., a second message). The message 210-a may request sensed location information associated with the UE 115-$a$ for verification of the location information included in the message 205-$a$. Based on receiving the message 210-$a$, the UE 115-$a$ may perform the sensing procedure to obtain the sensed location information. The UE 115-$a$ may perform the sensing procedure by using one or more sensors (e.g., IMU sensors, a camera system, a light detection and ranging (LIDAR) system, etc.) at the UE 115-$a$ to monitor for the sensed location information. The specific time at or duration during which the UE 115-$a$ performs the sensing procedure may be referred to as a sensing time. As such, the sensing time may be associated with the sensed location information obtained by the UE 115-$a$ during the sensing procedure. The UE 115-$a$ may transmit a report 215-$a$ indicating the sensed location information associated with the first UE 115-$a$ and the sensing time associated with the sensed location information. Based on the report 215-$a$, the server 220-$a$ may verify the authenticity of the location information reported by the UE 115-$a$ in the message 205-$a$.

In some other examples, the server 220-$a$ may request proof of the location information provided by one or more additional devices (e.g., a second UE) by requesting sensing location information from a more trusted entity (e.g., the UE 115-$a$, the network entity 105-$a$, the RSU 105-$b$, etc.). For instance, a second UE may determine its personal location information, where the location information includes the second UE's claimed identify, the UE 115-$a$'s claimed location, or both. The second UE may transmit a message indicating the location information associated with the second UE. Because the second UE may intentionally or unintentionally spoof its location information, the server 220-$a$ may request proof of the location information provided by the second UE based on a trusted UE, the network entity 105-$a$, the RSU 105-$b$, or any combination thereof.

In some aspects, the server 220-$a$ may consider the UE 115-$a$ to be trustworthy, and the server 220-$a$ may rely on the UE 115-$a$ to provide sensed location information (e.g., an absence, a presence, perceptive information, occupancy information, etc.) of one or more additional devices (e.g., a second UE 115) which may be activated or deactivated. Accordingly, the UE 115-$a$ may receive the message 210-$a$, where the message 210-$a$ requests sensed location information associated with the one or more additional devices (e.g., the second UE) for verification of the location information associated with the one or more additional devices (e.g., the second UE). Based on receiving the message 210-$a$, the UE 115-$a$ may perform the sensing procedure to obtain the sensed location information. The UE 115-$a$ may perform the sensing procedure at a sensing time by using one or more sensors (e.g., IMU sensors, a camera system, a LIDAR system, etc.) to monitor for the sensed location information associated with the one or more additional devices (e.g., the second UE). The UE 115-$a$ may transmit a report 215-$b$ indicating the sensed location information associated with the one or more additional devices (e.g., the second UE) and the sensing time associated with the sensed location information. Based on the report 215-$b$, the server 220-$a$ may verify the authenticity of the location information reported by the one or more additional devices.

In any case, the server 220-$a$ may transmit a verification message indicating a trustability or reliability of the location information reported by a device (e.g., the UE 115-$a$ or one or more additional devices) based on sensed location information obtained from a trusted device. For example, the server 220-$a$ may set a threshold (e.g., a mismatch threshold) as a criterion for determining a reliability level of the reported location information. Accordingly, the server 220-$a$ may transmit a verification message indicating the reliability level of the location information based on the sensed location information satisfying the threshold.

Figure 3:
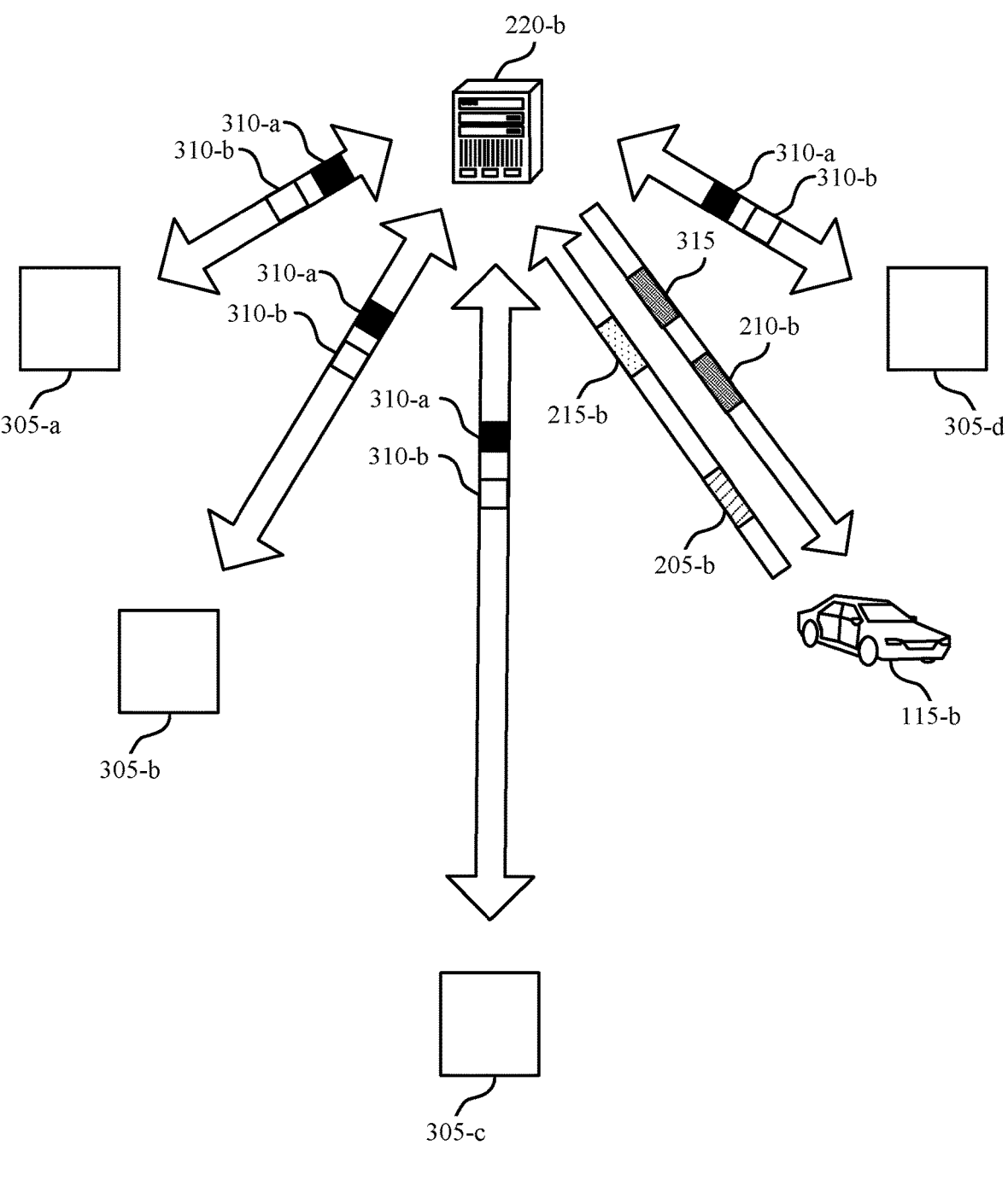
FIG. 3 illustrates an example of a wireless communications system 300 that supports methods for cloud based location verification for V2X systems in accordance with one or more aspects of the present disclosure.

FIG. 3 illustrates an example of a wireless communications system 300 that supports methods for cloud based location verification for V2X systems in accordance with one or more aspects of the present disclosure. The wireless communications system 300 may implement or be implemented by aspects of the wireless communications system 100 or 200 as described with reference to FIGS. 1 and 2. For example, the wireless communications system 300 may include UE 115-$b$, which may be an example of UE 115-$a$, or any other devices, as described herein. The wireless communications system 300 may support methods for proving the authenticity of location information reported by UE 115-$b$ based on a sensing procedure performed at UE 115-$b$, enhancing safety and coordination of devices within the wireless communications system 300. Although FIG. 3 illustrates UE 115-$a$ communicating with server 220-$b$, it may be understood that UE 115-$b$ may communicate similarly with other devices in the wireless communications system 300.

The wireless communications system 300 may illustrate an example of cloud based location verification that is based on cloud based geo-dynamic signature configuration and reporting. The server 220-$b$ may configure several devices 305 (e.g., V2X radios), where one or more of the devices 305 may be in the environment of a UE 115-$b$. Each of the devices 305 (e.g., a device 305-$a$, a device 305-$b$, a device 305-$c$, and a device 305-$d$) may be mounted on traffic signals, parking meters, RSUs, or other predefined places. In some examples, each of the devices 305 may be associated with a unique identity.

The server 220-$b$ may activate or deactivate the devices (e.g., a set of V2X radios) dynamically, thereby configuring a unique pseudo random signature. Additionally, the server 220-$b$ (e.g., a cloud) may be aware of a status of traffic lights in a geography zone based on the devices 305 which may be mounted on the traffic lights. For example, the server 220-$b$ may configure the devices 305 mounted on a set of traffic lights, where the UE 115-$b$ may report on the configured devices 305 based on a sensing procedure. The server 220-$b$ may be aware of the status of the set of traffic lights (e.g., the color of each traffic light) at every time instant. The server 220-$b$ may use the status of traffic lights as a signature ($a_1$, $a_2$, $a_3$, $a_4$), where $a_1$ is associated with the device 305-$a$, $a_2$ is associated with the device 305-$b$, $a_3$ is associated with the device 305-$c$, and $a_4$ is associated with the device 305-$d$. At time $t_2$, the server 220-$b$ may configure the signature to be different from what the signature is configured at a previous time instant $t_1$, making the signature dynamic. For instance, at time $t_1$, the server 220-$b$ may configure the signature to be (0, 0, 1, 0), meaning that the device 305-$c$ is activated while the devices 305-$a$, 305-$b$, and 305-d are deactivated (or vice versa). Meanwhile, at time $t_2$, the server 220-$b$ may configure the signature to be (1, 0, 1, 1), meaning that the devices 305-$a$, 305-$c$, and 305-$d$ are activated while the device 305-$c$ is deactivated (or vice versa).

In some examples, the devices 305 that are activated may emit a unique identify (e.g., identification information) that the UE 115-$b$ may report to prove its existence in a location. Because the signature of the traffic lights may be dynamically configured via the control messages 310 at various times, the server 220-$b$ may prevent two or more UEs 115 from cooperatively cheating the wireless communications system 300. For instance, even if the UE 115-$b$ provides a first signature of the traffic lights to a second UE 115, the server 220-*b* may configure an updated signature of the traffic lights such that the first signature provided by the UE 115-*b* is expired and no longer accurate.

In some examples, the server 220-*b* may dynamically configure the devices 305 by triggering an operating status (e.g., activation, deactivation, ON status, OFF status) of the devices 305 via control messages 310. For instance, the server 220-*b* may transmit a control message 310-*a* (e.g., a first control message) triggering a first operation status of the devices 305 at a first time $t_1$. Additionally, the server 220-*b* may transmit a control message 310-*b* (e.g., a second control message) triggering a second operation status of the devices 305 at a second time $t_2$.

In some cases, the server 220-*b* may transmit a configuration message 315. The configuration message 315 may indicate a mapping relationship between a bitmap parameter and the device 305, where each bit of the bitmap parameter is associated with one of the devices 305. Additionally, or alternatively, the configuration message 315 may indicate the devices 305 to be used for verification of location information associated with the UE 115-*b*. For instance, the server 220-*b* may configure a set of traffic lights for the UE 115-*b* to report on. In some examples, the server 220-*b* may be aware of the status of the traffic lights (e.g., color of traffic light) at every time instant, but the UE 115-*b* may not be aware of the status of the traffic lights at every time instant. For instance, the server 220-*b* may configure the set of traffic lights, $T=\{t_1, t_2, \ldots, t_n\}$. However, the UE 115-*b* may be able to observe a subset of T based on the current location of the UE 115-*b*. Accordingly, the UE 115-*b* may observe a status for each traffic light that may be one of {green, red, orange, not observable}, where the "not observable" status may indicate that the UE 115-*b* is unable to observe the respective traffic light due to its current location.

In some examples, the server 220-*b* may request for the UE 115-*b* to report additional sensed location information, where the additional sensed location information is associated with one or more additional UEs 115. For example, the server 220-*b* may configure the UE 115-*b* to report the identity or location of other UEs 115 that the UE 115-*b* is able to sense in its vicinity along with the UE 115-*b*'s own identity and location. Based on the crowd sourced information, the server 220-*b* may identify a rogue UE 115. However, the server 220-*b* may identify a rogue UE 115 using the crowd sourced information based on an assumption that UEs 115 do not cooperate in spreading misinformation (e.g., spoofed positioning information, spoofed identification information, etc.).

Accordingly, the UE 115-*b* may transmit a message 205-*b* indicating its location information, and the server 220-*b* may transmit a message 210-*b* requesting sensed location information from the UE 115-*b* to verify the reported location information. If the server 220-*b* transmits the control message 310-*b* triggering activation of the devices 305-*a*, 305-*c*, and 305-*d* and deactivation of the device 305-*a* at time $t_2$, the server 220-*b* may expect for the geo-dynamic signature to be (1, 0, 1, 1) from $t_2$ until a later time at which the server 220-*b* may reconfigure the devices 305. Accordingly, if the UE 115-*b* transmits a report indicating sensed location information, where the sensed location information further indicates the signature (1, 0, 1, 1) along with a sensing time that is equivalent to or after $t_2$, the server 220-*b* may verify that the location information reported by the UE 115-*b* is reliable. Due to the environment of the wireless communications system 300 and the time synchronization of the devices 305, the devices 305 sensed by the UE 115-*b* at the sensing time may not be exactly aligned with the geo-dynamic signature configured by the server 220-*b* at time $t_2$. Accordingly, the server 220-*b* may set a mismatch threshold as a criterion for signature match when determining the reliability of the location information reported by the UE 115-*b*.

Figure 4:
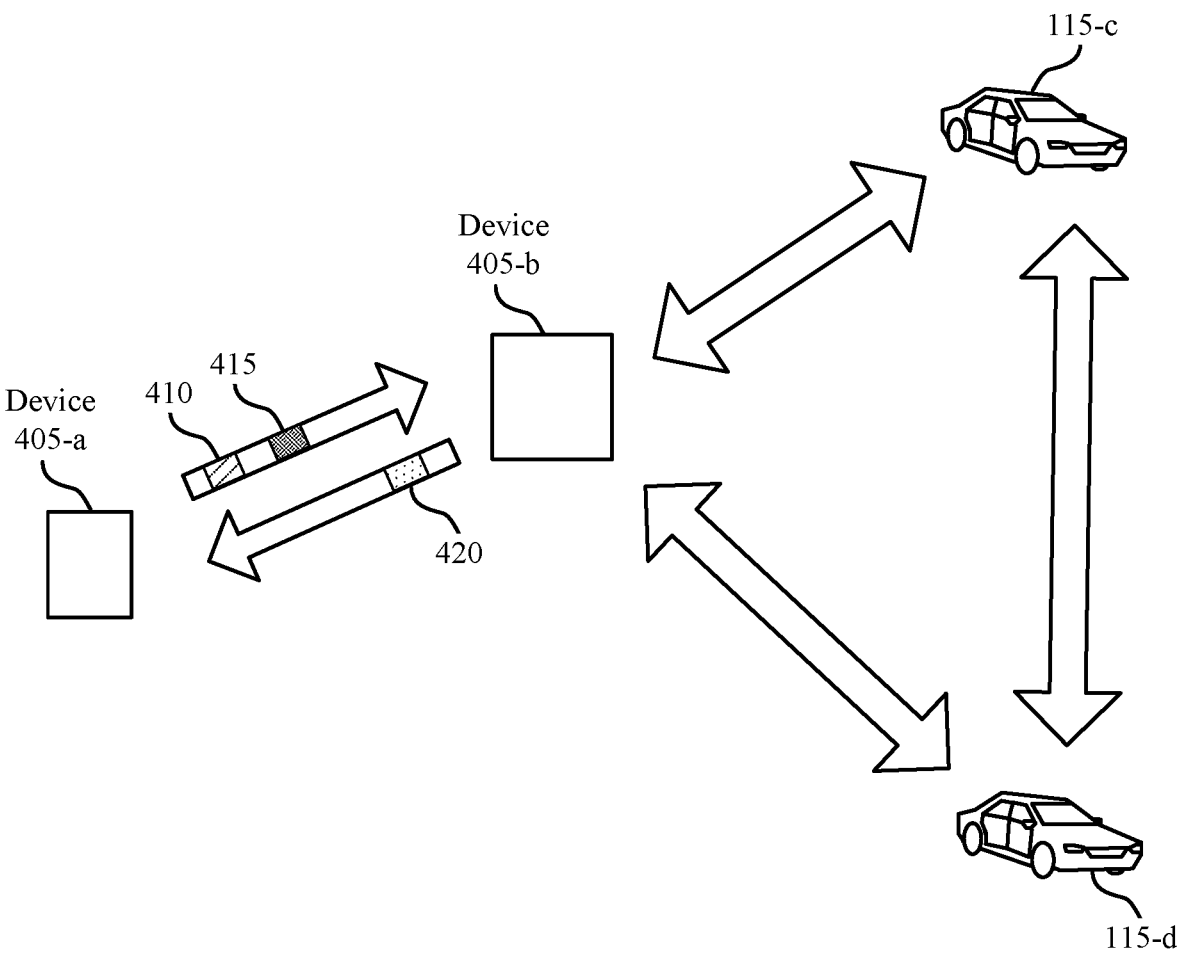
FIG. 4 illustrates an example of a wireless communications system 400 that supports methods for cloud based location verification for V2X systems in accordance with one or more aspects of the present disclosure.

FIG. 4 illustrates an example of a wireless communications system 400 that supports methods for cloud based location verification for V2X systems in accordance with one or more aspects of the present disclosure. The wireless communications system 400 may implement or be implemented by aspects of the wireless communications system 100, 200, or 300 as described with reference to FIGS. 1, 2, and 3. For example, the wireless communications system 400 may include UE 115-*c* and UE 115-*d*, which may be an example of UE 115, or any other devices, as described herein. The wireless communications system 400 may support methods for proving the authenticity of location information reported by one or more devices (e.g., UE 115-*c*, UE 115-*d*, or both) based on a sensing procedure performed at device 405-*b* (e.g., a UE 115, a network entity 105, or a RSU 105), enhancing safety and coordination of devices within the wireless communications system 400. Although FIG. 4 illustrates device 405-*b* communicating with device 405-*b*, UE 115-*c*, and UE 115-*d*, it may be understood that device 405-*b* may communicate similarly with other devices in the wireless communications system 400.

The wireless communications system 400 may illustrate an example of perceptive-wireless verification method where a device 405-*a* may request a device 405-*b* to perform perceptive-wireless verification of location information reported by one or more additional devices (e.g., a UE 115-*c*, a UE 115-*d*). In some cases, the device 405-*a* may be a server 220-*c* (e.g., a C2C server) or a UE (e.g., a UE without a camera). Additionally, or alternatively, the device 405-*b* may be a base station, a network entity, a RSU, a UE (e.g., a trusted UE equipped with a camera), or any other entity capable of obtaining sensed location information (e.g., perceptive information) by performing sensing procedure.

The device 405-*a* may configure the device 405-*b* with one or more perceptive identifiers for obtaining perceptive information (e.g., name plate number, color, make, model) of one or more additional devices. For instance, the device 405-*a* may transmit a configuration message 410. By transmitting the configuration message 410, the device 405-*a* may indicate one or more parameters associated with one or more perceptive identifiers at the device 405-*b*, where the one or more perceptive identifiers at the device 405-*b* may enable the device 405-*b* to monitor for various types of perceptive information. For instance, the configuration message 410 may indicate a first parameter enabling color identification and a second parameter enabling name plate number identification. Based on receiving the configuration message 410, the device 405-*b* may be able to monitor for various colors or name plate numbers. As such, the device 405-*b* may monitor for perceptive information at a sensing time in accordance with one or more perceptive identifiers.

The device 405-*b* may receive a message 415 (e.g., a first message) requesting sensed location information associated with one or more additional devices for verification of the location information associated with the one or more devices. In some examples, the device 405-*a* may send the message 415 to the device 405-*b* because the device 405-*a* considers the device 405-*b* to be a trusted entity in the wireless communications system 400. In other examples, the device 405-*a* may send the message 415 to the device 405-*b* because the device 405-*b* is better equipped to perform perceptive wireless verification of one or more additional device (e.g., the UE 115-*c*, the UE 115-*d*, or both). Accordingly, the device 405-*b* may perform a sensing procedure to obtain sensed location information (e.g., the perceptive information) in accordance with the perceptive identifiers based on receiving the message 415. Based on performing the sensing procedure, the device 405-*b* may determine sensed location information (e.g., perceptive information) associated with the one or more additional devices (e.g., the UE 115-*c*, the UE 115-*d*, or both). For example, the device 405-*b* may use a camera to monitor for and detect the name plate number and the color of the UE 115-*c* at a sensing time.

In some cases, the device 405-*b* may perform identity mapping between perceptive information and identification associated with a respective device of the one or more additional devices. For example, the device 405-*b* may transmit a basic safety message containing identification information. In such cases, the device 405-*b* may map perceptive information to an identification for the one or more additional devices (e.g., for the UE 115-*c*, for the UE 115-*d*), providing an additional source of mapping between the perceptive and radiofrequency world. The identification for the UE 115-*c* or the UE 115-*d* may be a function of one or more perceptive attributes. For instance, the device 405-*b* may determine a first identification for the UE 115-*c* based on detecting a blue color and a "12345" name plate number. Additionally, or alternatively, the device 405-*b* may determine a second identification for the UE 115-*d* based on detecting a black color and a "80001" name plate number, where the second identification is different from the first identification. In some cases, the device 405-*a* may be aware of the identity mapping between the perceptive information and the identification information. In such cases, the device 405-*a* may be aware that the UE 115-*c* associated with the first identification is blue with the "12345" name plate number, and that the UE 115-*d* associated with the second identification is black with the "80001" name plate number.

The device 405-*b* may transmit a report 420 indicating the sensed location information (e.g., perceptive information, positioning information) associated with the one or more additional devices (e.g., the UE 115-*c*, the UE 115-*d*, or both) and a sensing time associated with the sensed location information, where the sensed location information is based on the sensing procedure performed at the device 405-*b* at the sensing time. For example, the device 405-*b* may indicate the sensing time and the sensed location information of the UE 115-*c* to the device 405-*b*, where the sensed location information may include an identification, location, or both, associated with the UE 115-*c*.

In some examples, the device 405-*a* may configure the device 405-*b* with a geographical zone, where the device 405-*b* may be requested to report the occupancy of the one or more additional devices (e.g., the UE 115-*c*, the UE 115-*d*, or both) in the geographical zone. For instance, the configuration message 410 transmitted by the device 405-*a* may indicate a geographical zone corresponding to a pre-defined area. Additionally, the message 415 transmitted by the device 405-*a* may request sensed location information associated with the UE 115-*c*, the UE 115-*d*, or both. Based on the configuration message 410 and the message 415, the device 405-*b* may report sensed location information that is specifically within the boundaries of the geographical zone. In some examples, the device 405-*a* may configure the device 405-*b* with multiple geographical zones. In such examples, the device 405-*b* may report sensed location information within the boundaries of each of the multiple geographical zones.

For example, the device 405-*b* may be equipped with one or more sensors (e.g., camera, radar). The device 405-*b* may use the one or more sensors to report the occupancy of the UE 115-*c*, the UE 115-*d*, or both, in the geographical zone(s) configured by the device 405-*a*. In some cases, occupancy may indicate a presence or absence of the UE 115-*c* or the UE 115-*d* within the geographical zone. Additionally, or alternatively, occupancy may indicate the perceptive information of the UE 115-*c* or the UE 115-*d*. As such, the device 405-*b* may monitor for one or more additional devices (e.g., the UE 115-*c*, the UE 115-*d*, or both) at a sensing time using the one or more sensors at the device 405-*b* based on the geographical zone. Additionally, the device 405-*b* may determine the sensed information associated with the one or more additional devices based on performing the sensing procedure, where the sensed location information may include occupancy information indicating an absence, a presence, perceptive information, or a combination thereof, of the one or more additional devices.

Figure 5:
FIG. 5 illustrates an example of a wireless communications system 500 that supports methods for cloud based location verification for V2X systems in accordance with one or more aspects of the present disclosure.

FIG. 5 illustrates an example of a wireless communications system 500 that supports methods for cloud based location verification for V2X systems in accordance with one or more aspects of the present disclosure. The wireless communications system 500 may implement or be implemented by aspects of the wireless communications system 100, 200, 300, or 400 as described with reference to FIGS. 1, 2, 3, and 4. For example, the wireless communications system 500 may include network entity 105-*c*, which may be an example of network entity 105-*a*, or any other devices, as described herein. The wireless communications system 500 may support methods for proving the authenticity of location information reported by UE 115-*e* based on sensed location information provided by UE 115-*f* (which is associated with UE 115-*e*), enhancing safety and coordination of devices within the wireless communications system 500. Although FIG. 5 illustrates UEs 115-*e* and 115-*f* communicating with server 220-*c*, it may be understood that UEs 115-*e* and 115-*f* may communicate similarly with other devices in the wireless communications system 500.

The wireless communications system 500 may illustrate an example of an association based verification method. For instance, a server 220-*c* may verify location information reported by UE 115-*e* based on location information reported by UE 115-*f*, where UE 115-*f* is associated with UE 115-*e*. In some cases, UE 115-*f* may be located inside UE 115-*e*. In other cases, UE 115-*e* may be within an association area 505, where the association area 505 is a maximum area for which UE 115-*f* may be associated with UE 115-*e*.

In some examples, UE 115-*e* may transmit, and server 220-*c* may receive, a message 515 (e.g., a first message) indicating location information associated with UE 115-*e*. Additionally, network entity 105-*c* may transmit an association message 510 indicating that the location information reported by the UE 115-*e* is associated with UE 115-*f*. The network entity 105-*c* may notify the server 220-*c* of the association between the UE 115-*f* and the UE 115-*e* by transmitting the association message 510.

Being aware of the association between the UE 115-*f* and the UE 115-*e*, the server 220-*c* may request the UE 115-*f* or the UE 115-*e* to enable verification of location of each other. For example, the server 220-*c* may transmit a message 520 (e.g., a third message) requesting second location information associated with the UE 115-*f* based on receiving the association message 510. The UE 115-*f* may transmit a report 525 indicating sensed location information that is associated with the UE 115-*f*.

In some examples, the server 220-*c* may verify the location information associated with the UE 115-*e* and reported by the UE 115-*e* based on comparing the location information reported by the UE 115-*e* in the message 515 with the location information reported by the UE 115-*f* in the report 525. For instance, if the location information reported by the UE 115-*e* is equivalent to the location information reported by the UE 115-*f*, the server 220-*c* may determine that the location information reported by the UE 115-*e* is associated with a high reliability level (e.g., the location information is accurate and verified). Additionally, or alternatively, if the location information reported by the UE 115-*e* is different from the location information reported by the UE 115-*f*, the server 220-*c* may determine that the location information reported by the UE 115-*e* is associated with a lower reliability level (e.g., the location information is inaccurate or unverified). In some cases, the reliability level of the location information reported by the UE 115-*e* may be based on the sensed location information satisfying a set threshold for comparison.

Figure 6:
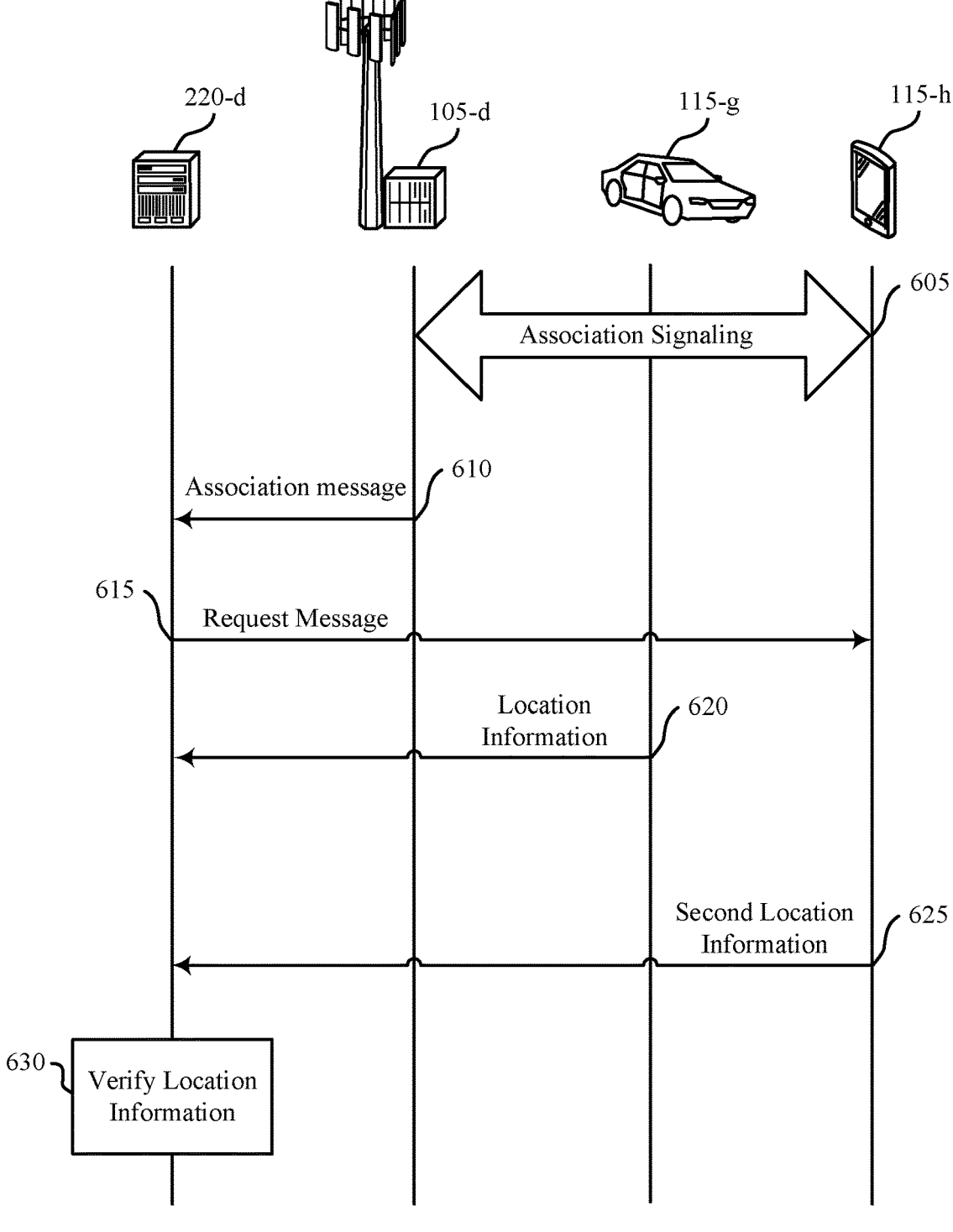
FIG. 6 illustrates an example of a process flow that supports methods for cloud based location verification for V2X systems in accordance with one or more aspects of the present disclosure.

FIG. 6 illustrates an example of a process flow 600 that supports methods for cloud based location verification for V2X systems in accordance with one or more aspects of the present disclosure. The process flow 600 may implement or be implemented by aspects of wireless communications system 100, wireless communications system 200, wireless communications system 300, wireless communications system 500, or a combination thereof, as described with reference to FIGS. 1, 2, 3, and 5. In some examples, the process flow 600 may include example operations associated with server 220-*d*, network entity 105-*d*, UE 115-*g*, or UE 115-*h*, which may be examples of the corresponding devices described with reference to FIGS. 1, 2, 3, and 5. In the following description of the process flow 600, the operations between server 220-*d*, network entity 105-*d*, UE 115-*g*, and UE 115-*h* may be performed in a different order than the example order shown, or the operations performed by server 220-*d*, network entity 105-*d*, UE 115-*g*, and UE 115-*h* may be performed in different orders or at different times. Some operations may also be omitted from the process flow 600, and other operations may also be added to the process flow 600. In some examples, UE 115-*g* may be a vehicular UE, and UE 115-*h* may be a mobile UE.

In some examples, the server may verify location information reported by a UE 115 (e.g., a vehicular UE 115) using association based verification.

At 605, a UE 115-*h* and the network entity 105-*d* may exchange association signaling. For example, the UE 115-*h* may connect with the network entity 105-*d* to obtain cellular service.

At 610, the network entity 105-*d* may transmit, and the server 220-*d* may receive an association message indicating that location information associated with the UE 115-*g* is associated with the UE 115-*h* (e.g., a second UE). As such, the network entity 105-*d* may make the server 220-*d* aware of an association between the UE 115-*h* and the UE 115-*g*. In some examples, the network entity 105-*d* may notify the server 220-*d* that the location of the UE 115-*h* can be interpreted to be the same for the UE 115-*g*. Additionally, or alternatively, the network entity 105-*d* may notify the server 220-*d* that the UE 115-*h* is within a threshold distance of the UE 115-*g*, where the threshold distance may define an maximum area for association with the UE 115-*h*.

At 615, the server 220-*d* may transmit, and the UE 115-*h* may receive, a request message (e.g., a third message) requesting second location information associated with the UE 115-*h* based on receiving the association message. For example, the server 220-*d* may request for the UE 115-*h* to send its location information so that the UE 115-*h* can prove or disprove the accuracy of the location information reported by the UE 115-*g*.

At 620, the UE 115-*g* may transmit, and the server 220-*d* may receive, a message (e.g., a first message) indicating location information associated with the UE 115-*g*. In some examples, the UE 115-*g* may intentionally or unintentionally spoof the location information. In other examples, the UE 115-*g* may provide accurate location information. The location information transmitted by the UE 115-*g* within the first message may include first identification information, first positioning information, or both.

At 625, the UE 115-*h* may transmit, and the server 220-*d* may receive, a report indicating the second location information associated with the UE 115-*h*.

At 630, the server 220-*d* may verify the location information reported by the UE 115-*g* at 620 based on comparing the location information associated with the UE 115-*g* with the second location information associated with the UE 115-*h*. In some examples, the server 220-*d* may transmit a verification message indicating a reliability level of the location information based on the second location information associated with the UE 115-*h* satisfying a threshold. For instance, if the second location information associated with the UE 115-*h* is within a threshold of the location information associated with the UE 115-*g*, the server 220-*d* may determine that the reliability level of the location information reported by the UE 115-*g* is high. Alternatively, if the second location information associated with the UE 115-*h* is outside a threshold of the location information associated with the UE 115-*g*, the server 220-*d* may determine that the reliability level of the location information reported by the UE 115-*g* is low.

Figure 7:
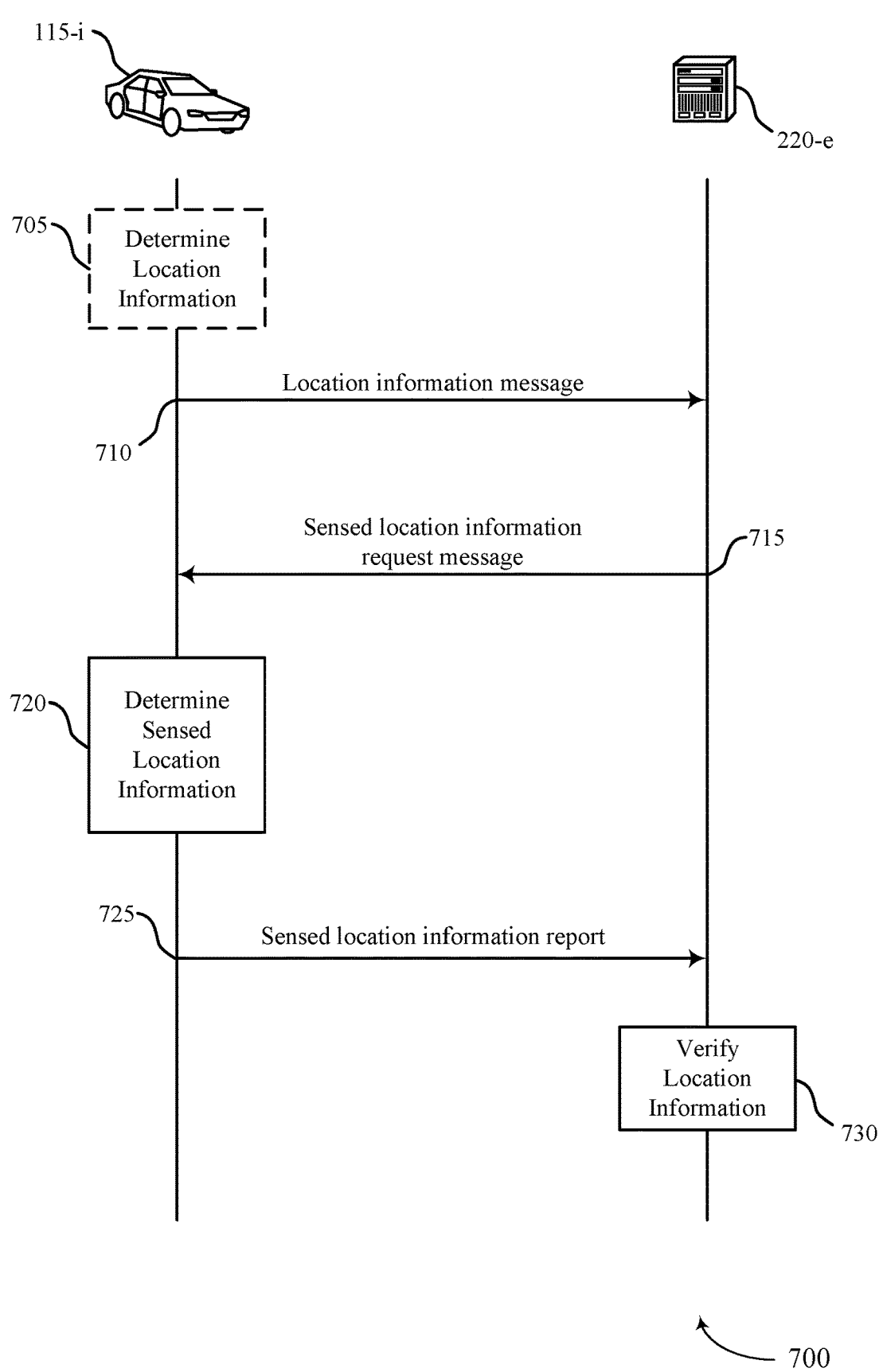
FIG. 7 illustrates an example of a process flow that supports methods for cloud based location verification for V2X systems in accordance with one or more aspects of the present disclosure.

FIG. 7 illustrates an example of a process flow 700 that supports methods for cloud based location verification for V2X systems in accordance with one or more aspects of the present disclosure. The process flow 700 may implement or be implemented by aspects of wireless communications system 100, wireless communications system 200, wireless communications system 300, wireless communications system 500, process flow 600, or a combination thereof, as described with reference to FIGS. 1, 2, 3, 5, and 6. In some examples, the process flow 700 may include example operations associated with UE 115-*i* or server 220-*e*, which may be examples of the corresponding devices described with reference to FIGS. 1, 2, 3, 4, and 6. In the following description of the process flow 700, the operations between UE 115-*i* and server 220-*e* may be performed in a different order than the example order shown, or the operations performed by UE 115-*i* and server 220-*e* may be performed in different orders or at different times. Some operations may also be omitted from the process flow 700, and other operations may also be added to the process flow 700. In some examples, UE 115-*i* may be a vehicular UE.

At 705, UE 115-*i* may determine location information associated with UE 115-*i*. The location information determined by UE 115-*i* may include first identification information, first positioning information, or both. In some cases, UE 115-*i* may intentionally or unintentionally spoof the first identification information, the first positioning information, or both. In other cases, the first identification information, the first positioning information, or both, may not be spoofed.

At 710, UE 115-*i* may transmit, and server 220-*e* may receive, a first message indicating location information associated with UE 115-*i*.

At 715, server 220-*e* may transmit, and UE 115-*i* may receive, a second message requesting sensed location information associated with UE 115-*i* for verification of the location information associated with UE 115-*i*. In some examples, server 220-*e* want UE 115-*i* to report additional sensed location information associated with other UEs 115 along with sensed location associated with UE 115-*i*. In such examples, the second message may request additional sensed location information associated with one or more additional UEs 115.

At 720, UE 115-*i* may perform the sensing procedure to obtain the sensed location information based on monitoring for the sensed location information using one or more sensors at UE 115-*i*. UE 115-*i* may determine the sensed location information associated with UE 115-*i* based on performing the sensing procedure, the sensed location information including second identification information, second positioning information, or both. If the location information reported at 710 was intentionally or unintentionally spoofed by UE 115-*i*, the second identification information, the second positioning information, or both, may contain information that is different form the first identification information, the first positioning information, or both. If server 220-*e* requested for UE 115-*i* to report additional sensed information associated with one or more additional UEs, UE 115-*i* may perform the sensing procedure to obtain the additional sensed location information.

In some examples, UE 115-*i* may determine the sensed location information based on using the one or more sensors at UE 115-*i* to monitor for one or more additional devices (e.g., V2X radios mounted on lamp posts, traffic signals, etc.), where the one or more additional devices are configured by server 220-*e*. For example, UE 115-*i* may receive a configuration message indicating a set of one or more additional devices to be used for the verification of the location information associated with UE 115-*i*. UE 115-*i* may perform the sensing procedure by monitoring a subset of the set of one or more additional devices based on a location of UE 115-*i*. For instance, server 220-*e* may send a configuration message indicating $T=\{t_1, t_2, t_3\}$, where T is a set of traffic lights configured by server 220-*e*. UE 115-*i* may be located such UE 115-*i* is able to observe $t_1$ and $t_2$, but not $t_3$. Accordingly, UE 115-*i* may monitor $t_1$ and $t_2$ of the set T during the sensing procedure.

In some aspects, UE 115-*i* may receive a configuration message indicating a mapping relationship between a bitmap parameter and one or more additional devices (e.g., V2X radios mounted on lamp posts, traffic signals, etc.), where each bit of the bitmap parameter is associated with a respective device of the one or more devices. For instance, server 220-*e* may indicate to UE 115-*i* that a first bit is to be associated with a first V2X radio on a lamp post, and a second bit is to be associated with a second V2X radio on a traffic signal.

In some examples, server 220-*e* may configure a geography based dynamic signature which may be detectable by UE 115-*i*. For example, server 220-*e* may transmit a first control message triggering a first operation status of one or more additional devices at a first time. Additionally, server 220-*e* may transmit a second control message triggering a second operation status of the one or more additional devices at a second time.

In some cases, UE 115-*i* may receive an identification indication associated with the one or more additional devices, where the identification indication may be received based on an operating status of the one or more additional devices. For example, if a first V2X radio is activated and a second V2X radio is deactivated, UE 115-*i* may receive a unique identification indication from the first V2X radio without receiving an identification indication from the second V2X radio. If UE 115-*i* performs the sensing procedure after server 220-*e* triggers the second operation status of the one or more additional devices (e.g., after the second time), server 220-*e* may expect UE 115-*i* to detect the second operation status, and observability status, an identification, or both, for the one or more additional devices.

At 725, UE 115-*i* may transmit a report indicating the sensed location information associated with UE 115-*i* and a sensing time associated with the sensed location information, where the sensed location information may be based on a sensing procedure performed by UE 115-*i* at the sensing time. In some aspects, UE 115-*i* may transmit the report indicating the sensed location information by transmitting the bitmap parameter, where each bit of the bitmap parameter indicates an operation status, an observability status, an identification, or a combination thereof, of the respective device of the one or more additional devices. For instance, UE 115-*i* may transmit the bitmap parameter {red, green, not-observable}, where the first bit is associated with an operation status for a first V2X radio mounted on a red traffic light, the second bit is associated with a second V2X radio mounted on a green traffic light, and the third bit is associated with a third V2X radio mounted on a traffic light that cannot be observed based on the location of UE 115-*i* at the sensing time during which the sensing procedure was performed by UE 115-*i*. In some examples, the sensed location information associated with UE 115-*i* may be associated with a second UE 115. For instance, if the second UE 115 is a mobile UE inside UE 115-*i*, which may be a vehicular UE, the sensed location information may be associated with UE 115-*i* and the second UE 115.

At 730, server 220-*e* may verify the location information reported by UE 115-*i* at 710 based on the sensed location information. For example, if server 220-*e* determines that the sensed location information matches the location information reported by UE 115-*i* (e.g., within some threshold criterion), server 220-*e* may determine that the location information reported by UE 115-*i* is to be associated with a higher reliability level.

FIG. 8 illustrates an example of a process flow 800 that supports methods for cloud based location verification for V2X systems in accordance with one or more aspects of the present disclosure. The process flow 800 may implement or be implemented by aspects of wireless communications system 100 and wireless communications system 400, as described with reference to FIGS. 1 and 4. In some examples, the process flow 800 may include example operations associated with device 405-*c* and device 405-*d*, which may be examples of the corresponding devices described with reference to FIGS. 1 and 4, In the following description of the process flow 800, the operations between device 405-*c* and device 405-*d* may be performed in a different order than the example order shown, or the operations performed by device 405-*c* and device 405-*d* may be performed in different orders or at different times. Some operations may also be omitted from the process flow 800, and other operations may also be added to the process flow 800. In some examples, device 405-*d* may be a server or a UE 115 without a camera. Additionally or alternatively device 405-*c* may be a UE 115, a network entity 105, a base station 140, or a RSU 105.

At 805, UE 115-*h* (e.g., a vehicular UE 115) may determine location information associated with UE 115-*h*. The location information determined by UE 115-*h* may include first identification information, first positioning information, or both. In some cases, UE 115-*h* may intentionally or unintentionally spoof the first identification information, the first positioning information, or both. In other cases, the first identification information, the first positioning information, or both, may not be spoofed.

At 810, UE 115-*h* may transmit, and device 405-*d* (e.g., a server) may receive, a first message indicating the location information associated with UE 115-*h*.

At 815, device 405-*d* may transmit, and device 405-*c* may receive a configuration message indicating a geographical zone corresponding to a predefined area, one or more respective perceptive identifiers associated with the one or more additional devices, or both. For instance, the configuration message may indicate an occupancy grid within which the device 405-*c* may monitor for the presence or absence of the one or more additional devices. Additionally, or alternatively, the configuration may indicate perceptive identifiers that enable the device 405-*c* to monitor for perceptive information (e.g., name plate details, color, make, model, etc.) of the one or more additional devices (e.g., UE 115-*h*).

At 820, device 405-*d* may transmit, and device 405-*c* may receive, a message requesting sensed location information associated with one or more additional devices for verification of location information associated with the one or more additional devices (e.g., the location information associated with UE 115-*h*).

At 830, device 405-*c* may determine sensed location information associated with the one or more additional devices based on performing the sensing procedure, where the sensed location information includes occupancy information. The occupancy information may indicate an absence, a presence, perceptive information, or a combination thereof, of the one or more additional devices. For example, device 405-*c* may monitor the one or more additional devices (e.g., UE 115-*h*) at the sensing time using one or more sensors at device 405-*c* based on the geographical zone. Additionally, or alternatively, device 405-*c* may monitor for perceptive information at the sensing time in accordance with the one or more respective perceptive identifiers based on receiving the message at 820.

At 835, device 405-*c* may transmit a report indicating the sensed location information associated with the one or more additional devices and a sensing time associated with the sensed location information, where the sensed location information is based on a sensing procedure performed by the device at the sensing time. In examples, devices 405-*c* may transmit the report indicating an identification associated with the one or more additional devices based on mapping the perceptive information to the identification associated with the one or more additional devices.

At 840, device 405-*d* may verify the location information reported by the one or more additional devices (e.g., UE 115-*h*) based on the sensed location information. For example, if device 405-*d* determines that the sensed location information matches the location information reported by UE 115-*h* (e.g., within some threshold criterion), device 405-*d* may determine that the location information reported by UE 115-*h* is to be associated with a higher reliability level.

Figure 9:
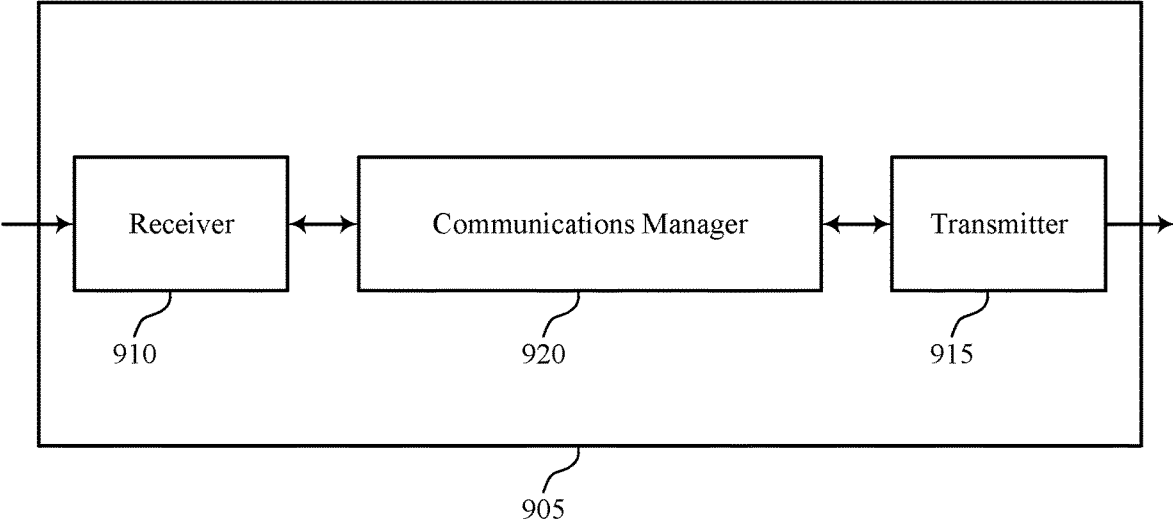
FIGS. 9 and 10 show block diagrams of devices that support methods for cloud based location verification for V2X systems in accordance with one or more aspects of the present disclosure.

FIG. 9 shows a block diagram 900 of a device 905 that supports methods for cloud based location verification for V2X systems in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to methods for cloud based location verification for V2X systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to methods for cloud based location verification for V2X systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of methods for cloud based location verification for V2X systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first UE in accordance with examples as disclosed herein. For example, the communications manager 920 may be configured as or otherwise support a means for transmitting a first message indicating location information associated with the first UE. The communications manager 920 may be configured as or otherwise support a means for receiving a second message requesting sensed location information associated with the first UE for verification of the location information associated with the first UE. The communications manager 920 may be configured as or otherwise support a means for transmitting a report indicating the sensed location information associated with the first UE and a sensing time associated with the sensed location information, where the sensed location information is based on a sensing procedure performed by the first UE at the sensing time.

Additionally, or alternatively, the communications manager 920 may support wireless communication at a device in accordance with examples as disclosed herein. For example, the communications manager 920 may be configured as or otherwise support a means for receiving a first message requesting sensed location information associated with one or more additional devices for verification of location information associated with the one or more additional devices. The communications manager 920 may be configured as or otherwise support a means for transmitting a report indicating the sensed location information associated with the one or more additional devices and a sensing time associated with the sensed location information, where the sensed location information is based on a sensing procedure performed by the device at the sensing time.

By including or configuring the communications manager 920 in accordance with examples as described herein, the device 905 (e.g., a processor controlling or otherwise coupled with the receiver 910, the transmitter 915, the communications manager 920, or a combination thereof) may support techniques reinforced trust in data consumed by the device 905, contributing to more efficient utilization of communication resources.

Figure 10:
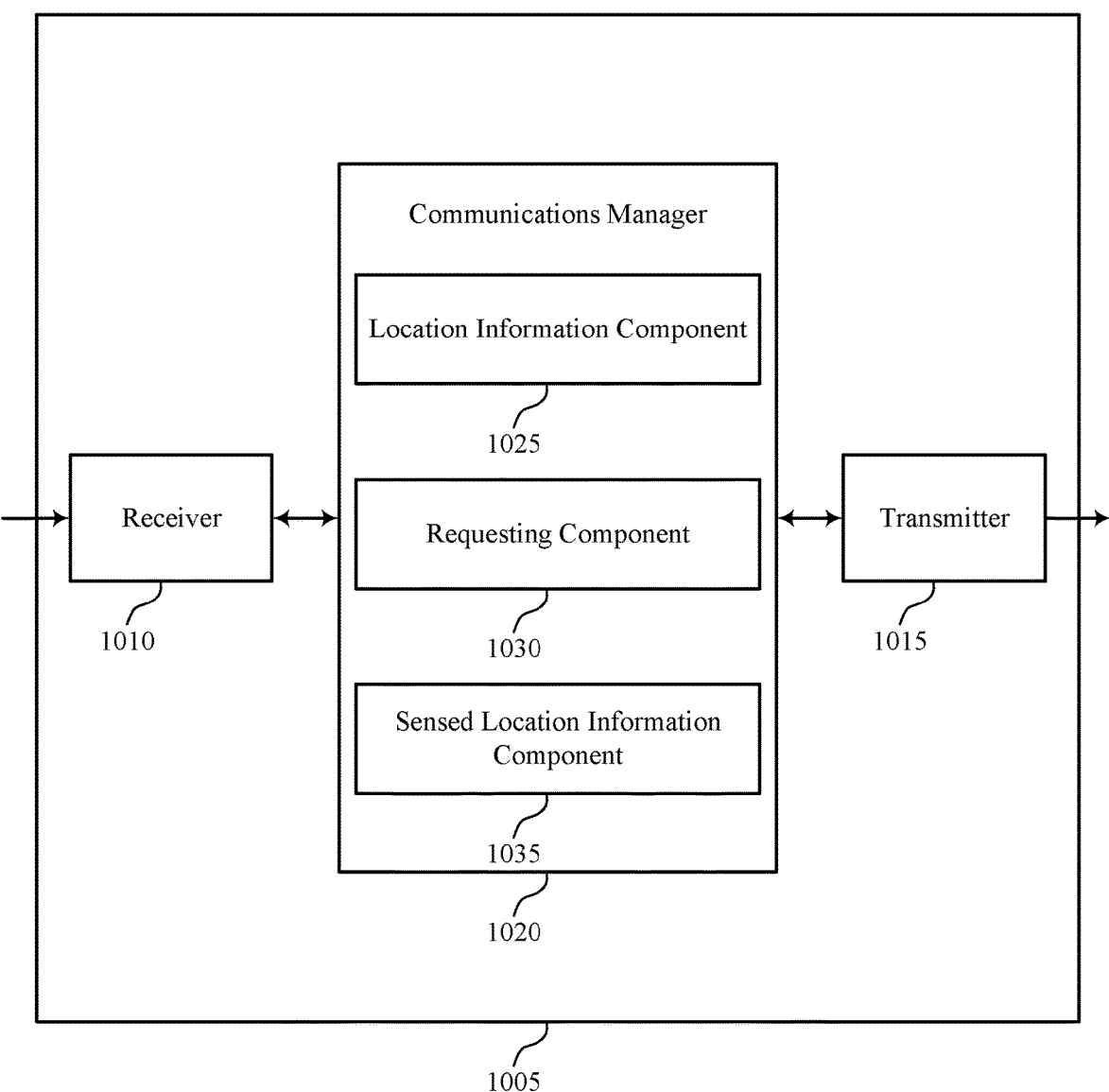

FIG. 10 shows a block diagram 1000 of a device 1005 that supports methods for cloud based location verification for V2X systems in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to methods for cloud based location verification for V2X systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to methods for cloud based location verification for V2X systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of methods for cloud based location verification for V2X systems as described herein. For example, the communications manager 1020 may include a location information component 1025, a requesting component 1030, a sensed location information component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first UE in accordance with examples as disclosed herein. The location information component 1025 may be configured as or otherwise support a means for transmitting a first message indicating location information associated with the first UE. The requesting component 1030 may be configured as or otherwise support a means for receiving a second message requesting sensed location information associated with the first UE for verification of the location information associated with the first UE. The sensed location information component 1035 may be configured as or otherwise support a means for transmitting a report indicating the sensed location information associated with the first UE and a sensing time associated with the sensed location information, where the sensed location information is based on a sensing procedure performed by the first UE at the sensing time.

Additionally, or alternatively, the communications manager 1020 may support wireless communication at a device in accordance with examples as disclosed herein. The requesting component 1030 may be configured as or otherwise support a means for receiving a first message requesting sensed location information associated with one or more additional devices for verification of location information associated with the one or more additional devices. The sensed location information component 1035 may be configured as or otherwise support a means for transmitting a report indicating the sensed location information associated with the one or more additional devices and a sensing time associated with the sensed location information, where the sensed location information is based on a sensing procedure performed by the device at the sensing time.

Figure 11:
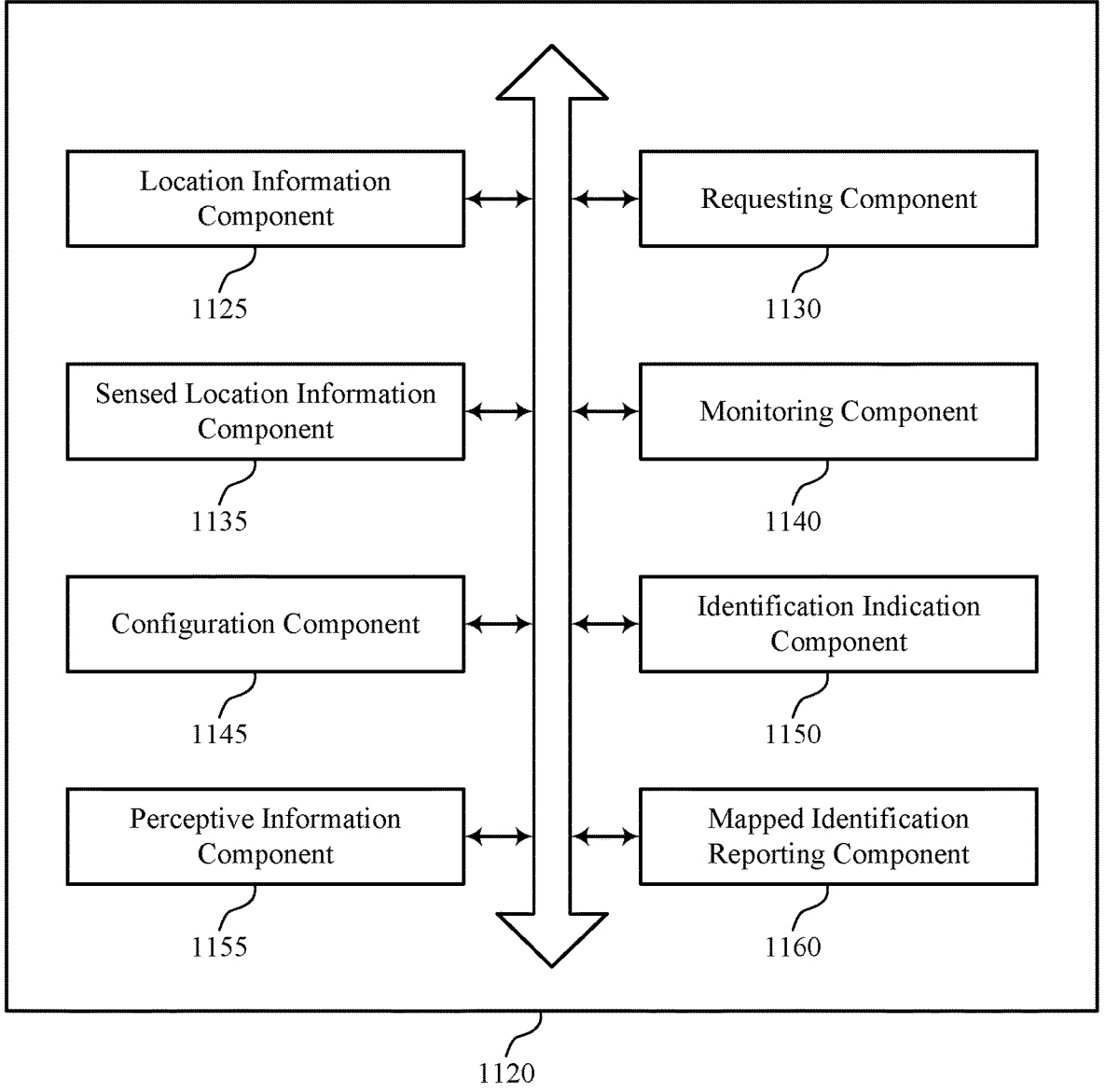
FIG. 11 shows a block diagram of a communications manager that supports methods for cloud based location verification for V2X systems in accordance with one or more aspects of the present disclosure.

FIG. 11 shows a block diagram 1100 of a communications manager 1120 that supports methods for cloud based location verification for V2X systems in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of methods for cloud based location verification for V2X systems as described herein. For example, the communications manager 1120 may include a location information component 1125, a requesting component 1130, a sensed location information component 1135, a monitoring component 1140, a configuration component 1145, an identification indication component 1150, a perceptive information component 1155, a mapped identification reporting component 1160, or any combination thereof. Each of these components may communicate, directly or indirectly, with one another (e.g., via one or more buses).

The communications manager 1120 may support wireless communication at a first UE in accordance with examples as disclosed herein. The location information component 1125 may be configured as or otherwise support a means for transmitting a first message indicating location information associated with the first UE. The requesting component 1130 may be configured as or otherwise support a means for receiving a second message requesting sensed location information associated with the first UE for verification of the location information associated with the first UE. The sensed location information component 1135 may be configured as or otherwise support a means for transmitting a report indicating the sensed location information associated with the first UE and a sensing time associated with the sensed location information, where the sensed location information is based on a sensing procedure performed by the first UE at the sensing time.

In some examples, the monitoring component 1140 may be configured as or otherwise support a means for performing the sensing procedure to obtain the sensed location information based on monitoring for the sensed location information using one or more sensors at the first UE.

In some examples, to support monitoring for the sensed location information, the identification indication component 1150 may be configured as or otherwise support a means for receiving an identification indication associated with one or more additional devices, where the identification indication is received based on an operating status of the one or more additional devices.

In some examples, to support monitoring for the sensed location information, the configuration component 1145 may be configured as or otherwise support a means for receiving a configuration message indicating a set of one or more additional devices to be used for the verification of the location information associated with the first UE. In some examples, to support monitoring for the sensed location information, the monitoring component 1140 may be configured as or otherwise support a means for monitoring a subset of the set of one or more additional devices based on a location of the first UE.

In some examples, the configuration component 1145 may be configured as or otherwise support a means for receiving a configuration message indicating a mapping relationship between a bitmap parameter and one or more additional devices, where each bit of the bitmap parameter is associated with a respective device of the one or more additional devices.

In some examples, to support transmitting the report indicating the sensed location information, the sensed location information component 1135 may be configured as or otherwise support a means for transmitting the bitmap parameter, where each bit of the bitmap parameter indicates an operation status, an observability status, an identification, or a combination thereof, of the respective device of the one or more additional devices.

In some examples, the location information component 1125 may be configured as or otherwise support a means for determining the location information associated with the first UE, the location information including first identification information, first positioning information, or both. In some examples, the sensed location information component 1135 may be configured as or otherwise support a means for determining the sensed location information associated with the first UE based on performing the sensing procedure, the sensed location information including second identification information, second positioning information, or both.

In some examples, the second message requests additional sensed location information associated with one or more additional UEs, and the requesting component 1130 may be configured as or otherwise support a means for performing the sensing procedure to obtain the additional sensed location information, where the report indicates the additional sensed location information.

In some examples, the sensed location information is associated with a second UE.

Additionally, or alternatively, the communications manager 1120 may support wireless communication at a device in accordance with examples as disclosed herein. In some examples, the requesting component 1130 may be configured as or otherwise support a means for receiving a first message requesting sensed location information associated with one or more additional devices for verification of location information associated with the one or more additional devices. In some examples, the sensed location information component 1135 may be configured as or otherwise support a means for transmitting a report indicating the sensed location information associated with the one or more additional devices and a sensing time associated with the sensed location information, where the sensed location information is based on a sensing procedure performed by the device at the sensing time.

In some examples, the configuration component 1145 may be configured as or otherwise support a means for receiving a configuration message indicating a geographical zone corresponding to a predefined area, one or more respective perceptive identifiers associated with the one or more additional devices, or both.

In some examples, the monitoring component 1140 may be configured as or otherwise support a means for monitoring for the one or more additional devices at the sensing time using one or more sensors at the device based on the geographical zone.

In some examples, the perceptive information component 1155 may be configured as or otherwise support a means for monitoring for perceptive information at the sensing time in accordance with the one or more respective perceptive identifiers based on receiving the first message. In some examples, the mapped identification reporting component 1160 may be configured as or otherwise support a means for transmitting the report indicating an identification associated with the one or more additional devices based on mapping the perceptive information to the identification associated with the one or more additional devices.

In some examples, the sensed location information component 1135 may be configured as or otherwise support a means for determining the sensed location information associated with the one or more additional devices based on performing the sensing procedure, the sensed location information including occupancy information, where the occupancy information indicates an absence, a presence, perceptive information, or a combination thereof, of the one or more additional devices.

In some examples, the device is one of a UE, a base station, a network entity, or an RSU.

Figure 12:
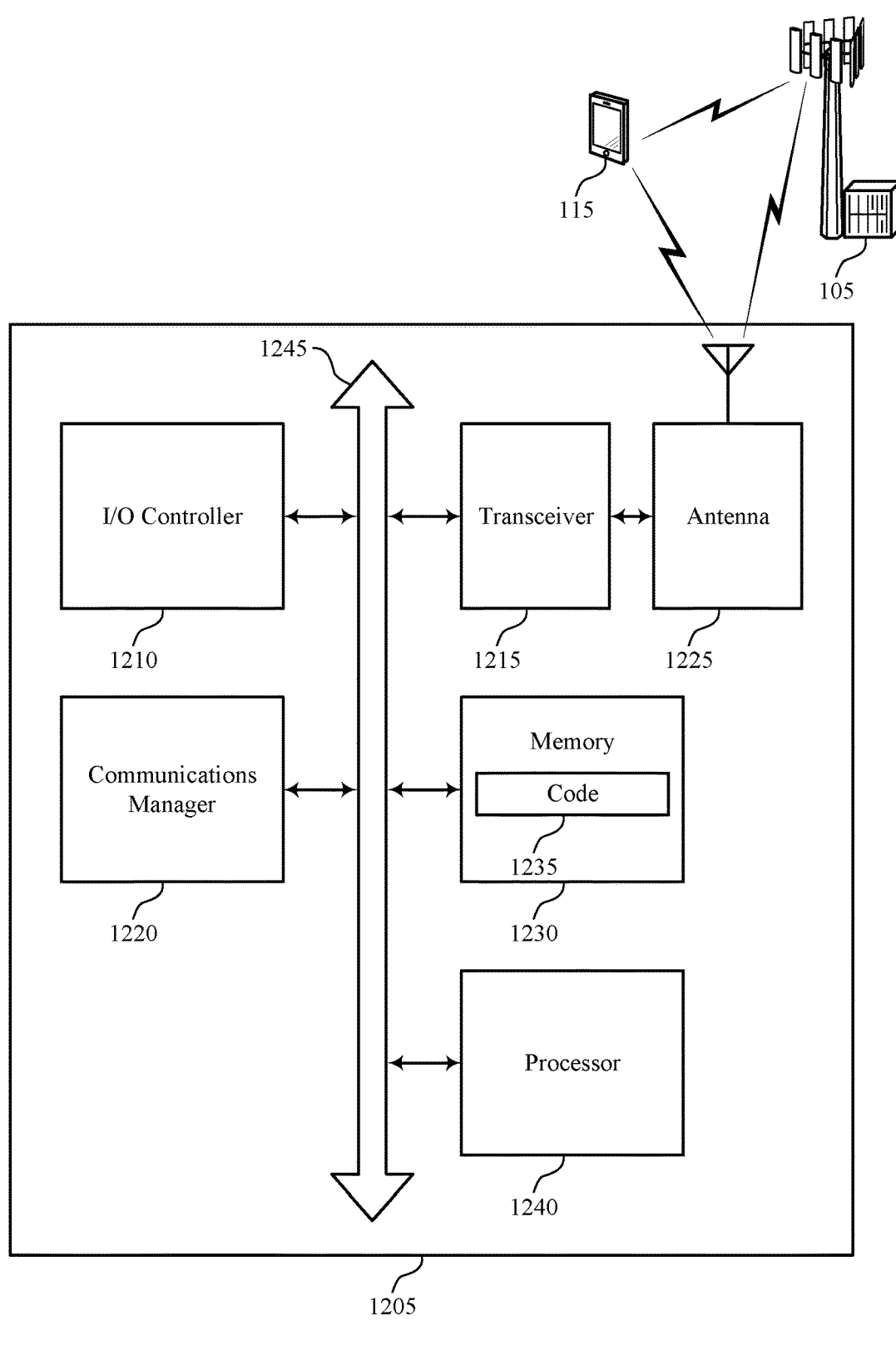
FIG. 12 shows a diagram of a system including a device that supports methods for cloud based location verification for V2X systems in accordance with one or more aspects of the present disclosure.

FIG. 12 shows a diagram of a system 1200 including a device 1205 that supports methods for cloud based location verification for V2X systems in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into processor 1240. The processor 1240 may be configured to execute computer-readable instructions stored in a memory (e.g., the memory 1230) to cause the device 1205 to perform various functions (e.g., functions or tasks supporting methods for cloud based location verification for V2X systems). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a first UE in accordance with examples as disclosed herein. For example, the communications manager 1220 may be configured as or otherwise support a means for transmitting a first message indicating location information associated with the first UE. The communications manager 1220 may be configured as or otherwise support a means for receiving a second message requesting sensed location information associated with the first UE for verification of the location information associated with the first UE. The communications manager 1220 may be configured as or otherwise support a means for transmitting a report indicating the sensed location information associated with the first UE and a sensing time associated with the sensed location information, where the sensed location information is based on a sensing procedure performed by the first UE at the sensing time.

Additionally, or alternatively, the communications manager 1220 may support wireless communication at a device in accordance with examples as disclosed herein. For example, the communications manager 1220 may be configured as or otherwise support a means for receiving a first message requesting sensed location information associated with one or more additional devices for verification of location information associated with the one or more additional devices. The communications manager 1220 may be configured as or otherwise support a means for transmitting a report indicating the sensed location information associated with the one or more additional devices and a sensing time associated with the sensed location information, where the sensed location information is based on a sensing procedure performed by the device at the sensing time.

By including or configuring the communications manager 1220 in accordance with examples as described herein, the device 1205 may support techniques for improved communication reliability, improved user experience related to communication reliability, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of methods for cloud based location verification for V2X systems as described herein, or the processor 1240 and the memory 1230 may be otherwise configured to perform or support such operations.

Figure 13:
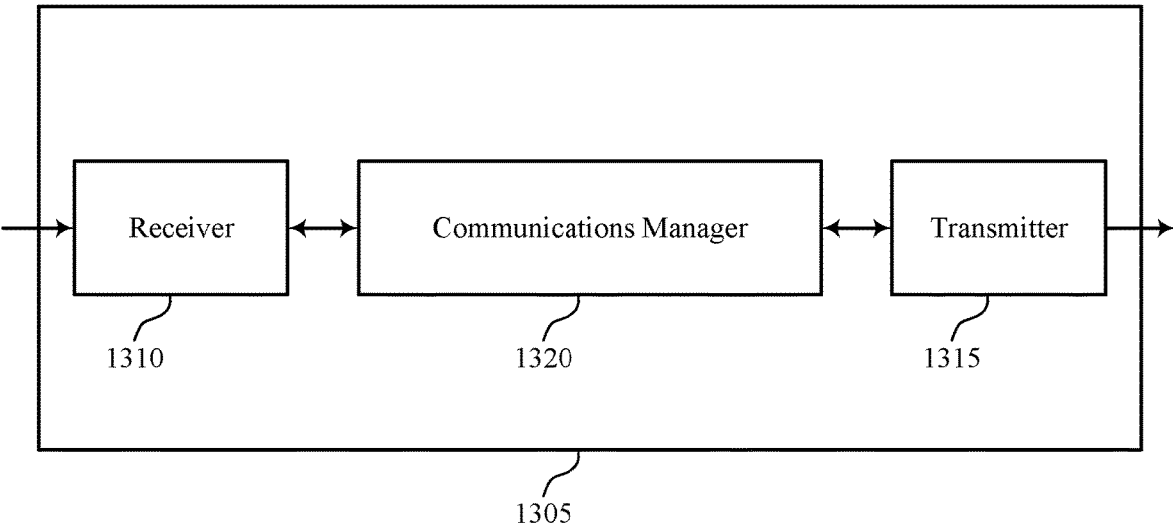
FIGS. 13 and 14 show block diagrams of devices that support methods for cloud based location verification for V2X systems in accordance with one or more aspects of the present disclosure.

FIG. 13 shows a block diagram 1300 of a device 1305 that supports methods for cloud based location verification for V2X systems in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of methods for cloud based location verification for V2X systems as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a server in accordance with examples as disclosed herein. For example, the communications manager 1320 may be configured as or otherwise support a means for receiving a first message indicating location information associated a first UE. The communications manager 1320 may be configured as or otherwise support a means for transmitting a second message requesting sensed location information for verification of the location information associated with the first UE. The communications manager 1320 may be configured as or otherwise support a means for receiving a report indicating the sensed location information and a sensing time associated with the sensed location information.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques for reinforced trust in data consumed by the device 905, contributing to more efficient utilization of communication resources.

Figure 14:
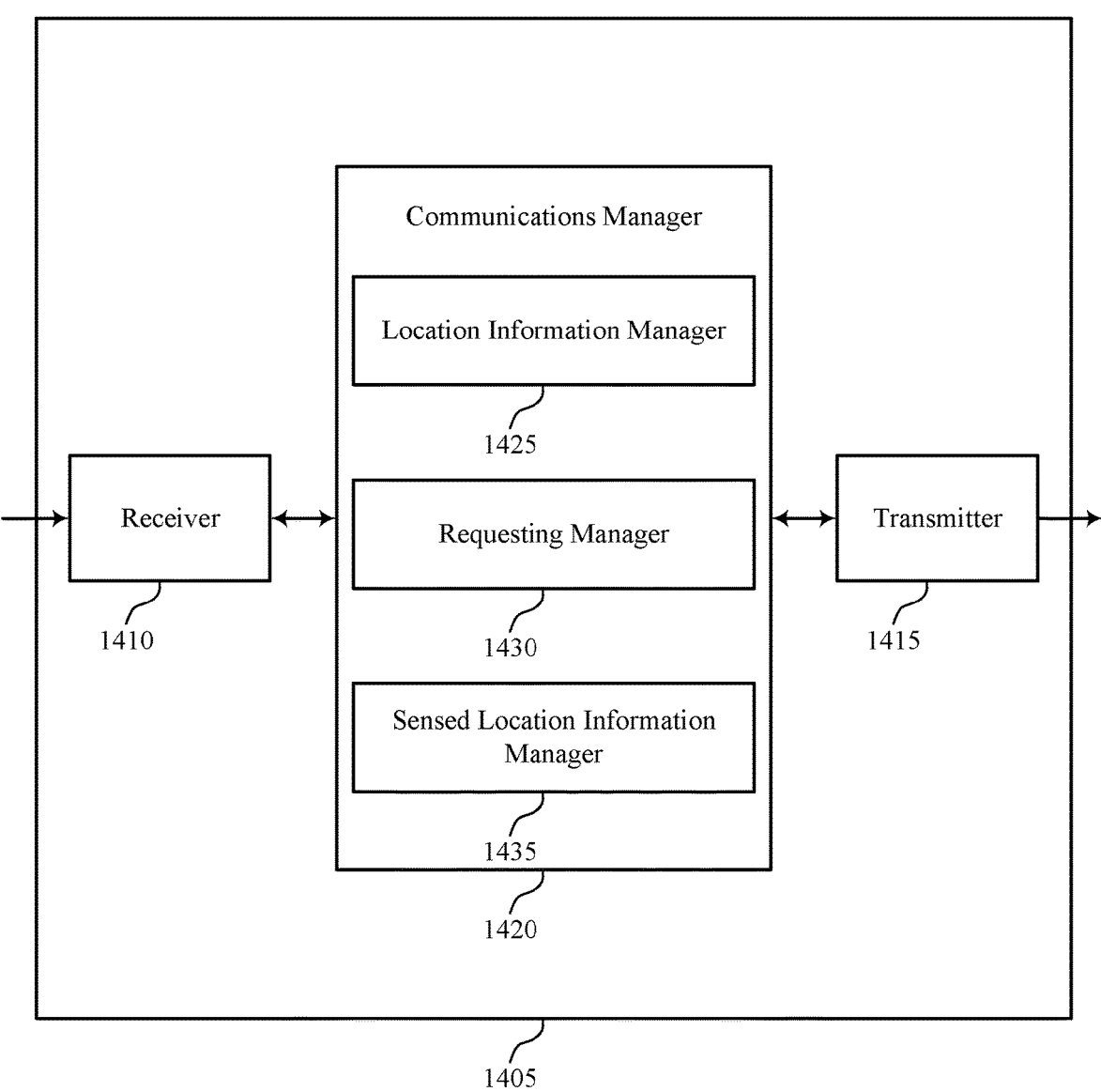

FIG. 14 shows a block diagram 1400 of a device 1405 that supports methods for cloud based location verification for V2X systems in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of methods for cloud based location verification for V2X systems as described herein. For example, the communications manager 1420 may include a location information manager 1425, a requesting manager 1430, a sensed location information manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a server in accordance with examples as disclosed herein. The location information manager 1425 may be configured as or otherwise support a means for receiving a first message indicating location information associated a first UE. The requesting manager 1430 may be configured as or otherwise support a means for transmitting a second message requesting sensed location information for verification of the location information associated with the first UE. The sensed location information manager 1435 may be configured as or otherwise support a means for receiving a report indicating the sensed location information and a sensing time associated with the sensed location information.

Figure 15:
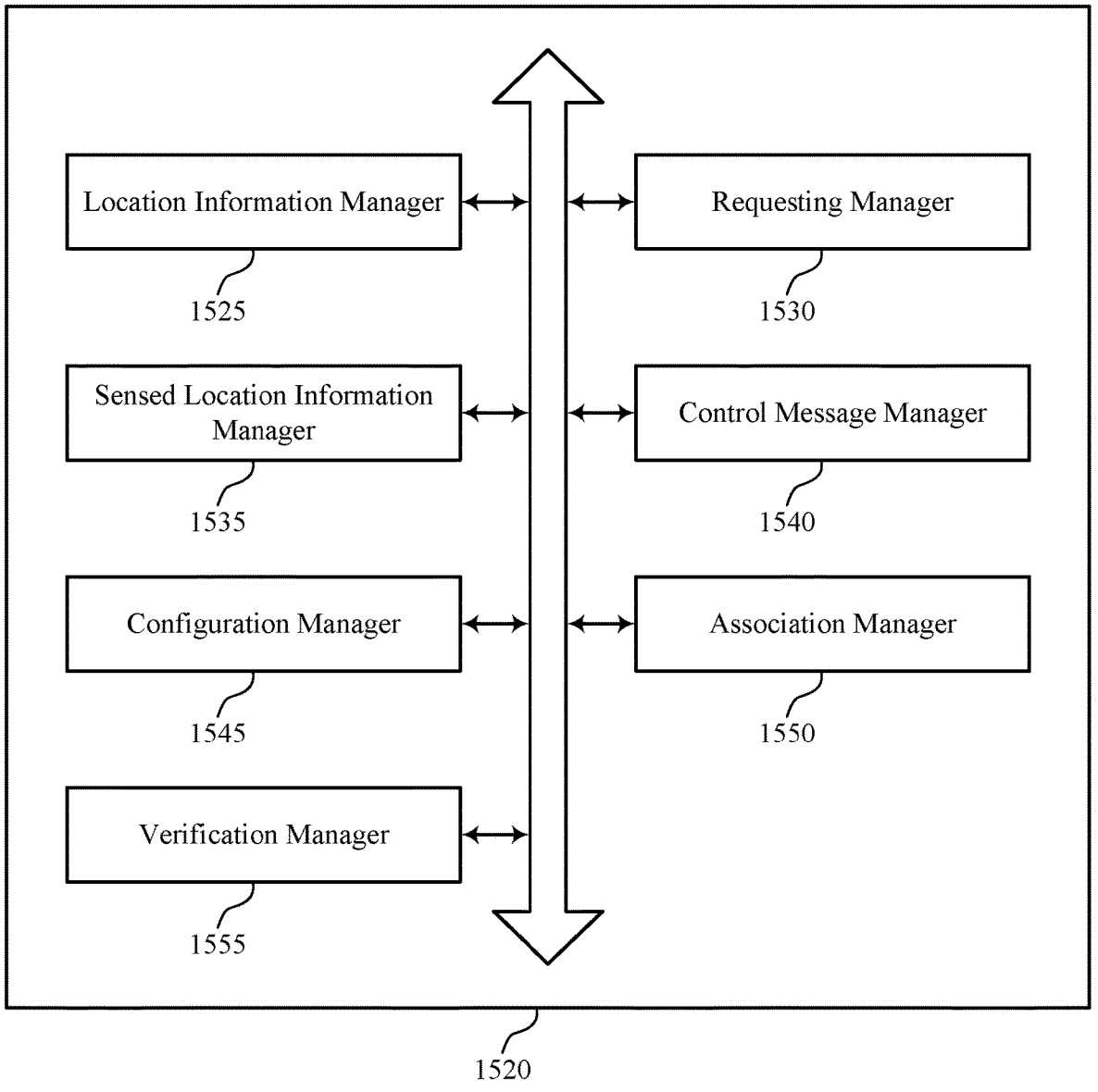
FIG. 15 shows a block diagram of a communications manager that supports methods for cloud based location verification for V2X systems in accordance with one or more aspects of the present disclosure.

FIG. 15 shows a block diagram 1500 of a communications manager 1520 that supports methods for cloud based location verification for V2X systems in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of methods for cloud based location verification for V2X systems as described herein. For example, the communications manager 1520 may include a location information manager 1525, a requesting manager 1530, a sensed location information manager 1535, a control message manager 1540, a configuration manager 1545, an association manager 1550, a verification manager 1555, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a server in accordance with examples as disclosed herein. The location information manager 1525 may be configured as or otherwise support a means for receiving a first message indicating location information associated a first UE. The requesting manager 1530 may be configured as or otherwise support a means for transmitting a second message requesting sensed location information for verification of the location information associated with the first UE. The sensed location information manager 1535 may be configured as or otherwise support a means for receiving a report indicating the sensed location information and a sensing time associated with the sensed location information.

In some examples, the control message manager 1540 may be configured as or otherwise support a means for transmitting a first control message triggering a first operation status of one or more additional devices at a first time. In some examples, the control message manager 1540 may be configured as or otherwise support a means for transmitting a second control message triggering a second operation status of the one or more additional devices at a second time.

In some examples, the configuration manager 1545 may be configured as or otherwise support a means for transmitting a configuration message indicating a mapping relationship between a bitmap parameter and one or more additional devices, where each bit of the bitmap parameter is associated with a respective device of the one or more additional devices.

In some examples, to support receiving the report indicating the sensed location information, the sensed location information manager 1535 may be configured as or otherwise support a means for receiving the bitmap parameter, where each bit of the bitmap parameter indicates an operation status, a observability status, an identification, or both, of a respective device of the one or more additional devices.

In some examples, to support receiving the first message, the location information manager 1525 may be configured as or otherwise support a means for receiving the first message indicating the location information associated with the first UE, the location information including first identification information, first positioning information, or both.

In some examples, to support transmitting the second message, the requesting manager 1530 may be configured as or otherwise support a means for transmitting the second message requesting the sensed location information, the sensed location information including occupancy information of one or more additional UEs.

In some examples, the occupancy information indicates an absence in a geographical zone, a presence in the geographical zone, perceptive information, or a combination thereof, of the one or more additional UEs.

In some examples, the configuration manager 1545 may be configured as or otherwise support a means for transmitting a configuration message indicating a geographical zone corresponding to a predefined area, one or more perceptive identifiers associated one or more additional UEs, or both.

In some examples, the configuration manager 1545 may be configured as or otherwise support a means for transmitting a configuration message indicating a set of one or more additional devices to be used for the verification of the location information associated with the first UE.

In some examples, the second message requests additional sensed location information associated with one or more additional UEs. In some examples, the report indicates the additional sensed location information.

In some examples, the association manager 1550 may be configured as or otherwise support a means for receiving an association message indicating that the sensed location information is associated with a second UE.

In some examples, the verification manager 1555 may be configured as or otherwise support a means for transmitting a verification message indicating a reliability level of the location information based on the sensed location information satisfying a threshold.

Figure 16:
FIG. 16 shows a diagram of a system including a device that supports methods for cloud based location verification for V2X systems in accordance with one or more aspects of the present disclosure.

FIG. 16 shows a diagram of a system 1600 including a device 1605 that supports methods for cloud based location verification for V2X systems in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting methods for cloud based location verification for V2X systems). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1605 may transmit information output from the chip or modem. Additionally, or alternatively, in some implementations, the one or more interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a server in accordance with examples as disclosed herein. For example, the communications manager 1620 may be configured as or otherwise support a means for receiving a first message indicating location information associated a first UE. The communications manager 1620 may be configured as or otherwise support a means for transmitting a second message requesting sensed location information for verification of the location information associated with the first UE. The communications manager 1620 may be configured as or otherwise support a means for receiving a report indicating the sensed location information and a sensing time associated with the sensed location information.

By including or configuring the communications manager 1620 in accordance with examples as described herein, the device 1605 may support techniques for improved communication reliability, improved user experience related to communication reliability, more efficient utilization of communication resources, improved coordination between devices, and improved utilization of processing capability.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of methods for cloud based location verification for V2X systems as described herein, or the processor 1635 and the memory 1625 may be otherwise configured to perform or support such operations.

FIG. 17 shows a flowchart illustrating a method 1700 that supports methods for cloud based location verification for V2X systems in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include transmitting a first message indicating location information associated with the first UE. The operations of 1705 may be performed in accordance with examples as disclosed herein. In some examples, aspects of the operations of 1705 may be performed by a location information component 1125 as described with reference to FIG. 11.

At 1710, the method may include receiving a second message requesting sensed location information associated with the first UE for verification of the location information associated with the first UE. The operations of 1710 may be performed in accordance with examples as disclosed herein. In some examples, aspects of the operations of 1710 may be performed by a requesting component 1130 as described with reference to FIG. 11.

At 1715, the method may include transmitting a report indicating the sensed location information associated with the first UE and a sensing time associated with the sensed location information, where the sensed location information is based on a sensing procedure performed by the first UE at the sensing time. The operations of 1715 may be performed in accordance with examples as disclosed herein. In some examples, aspects of the operations of 1715 may be performed by a sensed location information component 1135 as described with reference to FIG. 11.

FIG. 18 shows a flowchart illustrating a method 1800 that supports methods for cloud based location verification for V2X systems in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include determining location information associated with the first UE, the location information including first identification information, first positioning information, or both. The operations of 1805 may be performed in accordance with examples as disclosed herein. In some examples, aspects of the operations of 1805 may be performed by a location information component 1125 as described with reference to FIG. 11.

At 1810, the method may include transmitting a first message indicating the location information associated with the first UE. The operations of 1810 may be performed in accordance with examples as disclosed herein. In some examples, aspects of the operations of 1810 may be performed by a location information component 1125 as described with reference to FIG. 11.

At 1815, the method may include receiving a second message requesting sensed location information associated with the first UE for verification of the location information associated with the first UE. The operations of 1815 may be performed in accordance with examples as disclosed herein. In some examples, aspects of the operations of 1815 may be performed by a requesting component 1130 as described with reference to FIG. 11.

At 1820, the method may include determining the sensed location information associated with the first UE based on performing the sensing procedure, the sensed location information including second identification information, second positioning information, or both. The operations of 1820 may be performed in accordance with examples as disclosed herein. In some examples, aspects of the operations of 1820 may be performed by a sensed location information component 1135 as described with reference to FIG. 11.

At 1825, the method may include transmitting a report indicating the sensed location information associated with the first UE and a sensing time associated with the sensed location information, where the sensed location information is based on the sensing procedure performed by the first UE at the sensing time. The operations of 1825 may be performed in accordance with examples as disclosed herein. In some examples, aspects of the operations of 1825 may be performed by a sensed location information component 1135 as described with reference to FIG. 11.

FIG. 19 shows a flowchart illustrating a method 1900 that supports methods for cloud based location verification for V2X systems in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving a first message requesting sensed location information associated with one or more additional devices for verification of location information associated with the one or more additional devices. The operations of 1905 may be performed in accordance with examples as disclosed herein. In some examples, aspects of the operations of 1905 may be performed by a requesting component 1130 as described with reference to FIG. 11.

At 1910, the method may include transmitting a report indicating the sensed location information associated with the one or more additional devices and a sensing time associated with the sensed location information, where the sensed location information is based on a sensing procedure performed by the device at the sensing time. The operations of 1910 may be performed in accordance with examples as disclosed herein. In some examples, aspects of the operations of 1910 may be performed by a sensed location information component 1135 as described with reference to FIG. 11.

FIG. 20 shows a flowchart illustrating a method 2000 that supports methods for cloud based location verification for V2X systems in accordance with one or more aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2005, the method may include receiving a first message requesting sensed location information associated with one or more additional devices for verification of location information associated with the one or more additional devices. The operations of 2005 may be performed in accordance with examples as disclosed herein. In some examples, aspects of the operations of 2005 may be performed by a requesting component 1130 as described with reference to FIG. 11.

At 2010, the method may include determining the sensed location information associated with the one or more additional devices based on performing a sensing procedure, the sensed location information including occupancy information, where the occupancy information indicates an absence, a presence, perceptive information, or a combination thereof, of the one or more additional devices. The operations of 2010 may be performed in accordance with examples as disclosed herein. In some examples, aspects of the operations of 2010 may be performed by a sensed location information component 1135 as described with reference to FIG. 11.

At 2015, the method may include transmitting a report indicating the sensed location information associated with the one or more additional devices and a sensing time associated with the sensed location information, where the sensed location information is based on the sensing procedure performed by the device at the sensing time. The operations of 2015 may be performed in accordance with examples as disclosed herein. In some examples, aspects of the operations of 2015 may be performed by a sensed location information component 1135 as described with reference to FIG. 11.

Figure 21:
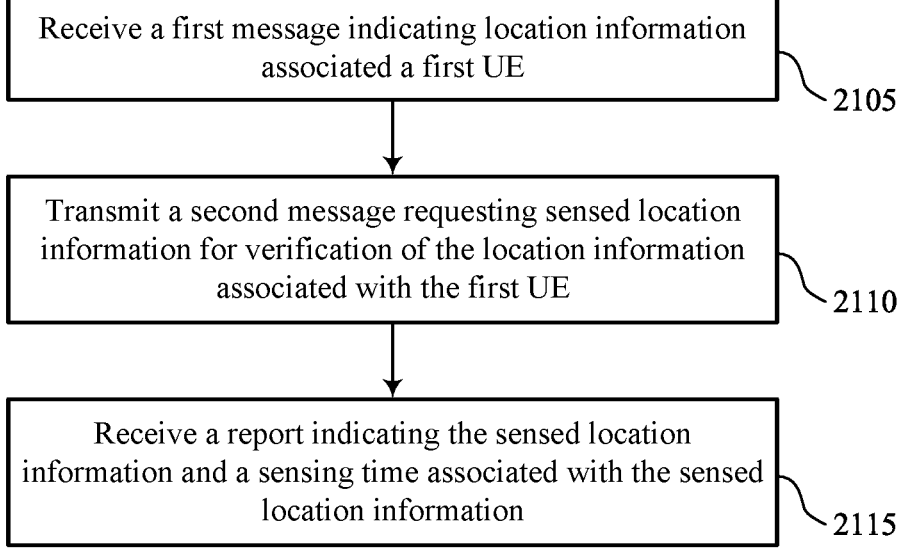

FIG. 21 shows a flowchart illustrating a method 2100 that supports methods for cloud based location verification for V2X systems in accordance with one or more aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2105, the method may include receiving a first message indicating location information associated a first UE. The operations of 2105 may be performed in accordance with examples as disclosed herein. In some examples, aspects of the operations of 2105 may be performed by a location information manager 1525 as described with reference to FIG. 15.

At 2110, the method may include transmitting a second message requesting sensed location information for verification of the location information associated with the first UE. The operations of 2110 may be performed in accordance with examples as disclosed herein. In some examples, aspects of the operations of 2110 may be performed by a requesting manager 1530 as described with reference to FIG. 15.

At 2115, the method may include receiving a report indicating the sensed location information and a sensing time associated with the sensed location information. The operations of 2115 may be performed in accordance with examples as disclosed herein. In some examples, aspects of the operations of 2115 may be performed by a sensed location information manager 1535 as described with reference to FIG. 15.

FIG. 22 shows a flowchart illustrating a method 2200 that supports methods for cloud based location verification for V2X systems in accordance with one or more aspects of the present disclosure. The operations of the method 2200 may be implemented by a network entity or its components as described herein. For example, the operations of the method 2200 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2205, the method may include receiving a first message indicating location information associated a first UE. The operations of 2205 may be performed in accordance with examples as disclosed herein. In some examples, aspects of the operations of 2205 may be performed by a location information manager 1525 as described with reference to FIG. 15.

At 2210, the method may include receiving an association message indicating that sensed location information is associated with a second UE. The operations of 2210 may be performed in accordance with examples as disclosed herein. In some examples, aspects of the operations of 2210 may be performed by an association manager 1550 as described with reference to FIG. 15. In some examples, the association may indicate that the second UE is associated with the first UE.

At 2215, the method may include transmitting a second message requesting sensed location information for verification of the location information associated with the first UE. The operations of 2215 may be performed in accordance with examples as disclosed herein. In some examples, aspects of the operations of 2215 may be performed by a requesting manager 1530 as described with reference to FIG. 15.

At 2220, the method may include receiving a report indicating the sensed location information and a sensing time associated with the sensed location information. The operations of 2220 may be performed in accordance with examples as disclosed herein. In some examples, aspects of the operations of 2220 may be performed by a sensed location information manager 1535 as described with reference to FIG. 15.

The following provides an overview of aspects of the present disclosure:

Aspect 1: A method for wireless communication at a first UE, comprising: transmitting a first message indicating location information associated with the first UE; receiving a second message requesting sensed location information associated with the first UE for verification of the location information associated with the first UE; and transmitting a report indicating the sensed location information associated with the first UE and a sensing time associated with the sensed location information, wherein the sensed location information is based at least in part on a sensing procedure performed by the first UE at the sensing time.

Aspect 2: The method of aspect 1, further comprising: performing the sensing procedure to obtain the sensed location information based at least in part on monitoring for the sensed location information using one or more sensors at the first UE.

Aspect 3: The method of aspect 2, wherein monitoring for the sensed location information comprises: receiving an identification indication associated with one or more additional devices, wherein the identification indication is received based at least in part on an operating status of the one or more additional devices.

Aspect 4: The method of aspect 2, wherein monitoring for the sensed location information comprises: receiving a configuration message indicating a set of one or more additional devices to be used for the verification of the location information associated with the first UE; and monitoring a subset of the set of one or more additional devices based at least in part on a location of the first UE.

Aspect 5: The method of any of aspects 1 through 4, further comprising: receiving a configuration message indicating a mapping relationship between a bitmap parameter and one or more additional devices, wherein each bit of the bitmap parameter is associated with a respective device of the one or more additional devices.

Aspect 6: The method of aspect 5, wherein transmitting the report indicating the sensed location information comprises: transmitting the bitmap parameter, wherein each bit of the bitmap parameter indicates an operation status, an observability status, an identification, or a combination thereof, of the respective device of the one or more additional devices.

Aspect 7: The method of any of aspects 1 through 6, further comprising: determining the location information associated with the first UE, the location information comprising first identification information, first positioning information, or both; and determining the sensed location information associated with the first UE based at least in part on performing the sensing procedure, the sensed location information comprising second identification information, second positioning information, or both.

Aspect 8: The method of any of aspects 1 through 7, wherein the second message requests additional sensed location information associated with one or more additional UEs, the method further comprising: performing the sensing procedure to obtain the additional sensed location information, wherein the report indicates the additional sensed location information.

Aspect 9: The method of any of aspects 1 through 8, wherein the sensed location information is associated with a second UE.

Aspect 10: A method for wireless communication at a device, comprising: receiving a first message requesting sensed location information associated with one or more additional devices for verification of location information associated with the one or more additional devices; and transmitting a report indicating the sensed location information associated with the one or more additional devices and a sensing time associated with the sensed location information, wherein the sensed location information is based at least in part on a sensing procedure performed by the device at the sensing time.

Aspect 11: The method of aspect 10, further comprising: receiving a configuration message indicating a geographical zone corresponding to a predefined area, one or more respective perceptive identifiers associated with the one or more additional devices, or both.

Aspect 12: The method of aspect 11, further comprising: monitoring for the one or more additional devices at the sensing time using one or more sensors at the device based at least in part on the geographical zone.

Aspect 13: The method of any of aspects 11 through 12, further comprising: monitoring for perceptive information at the sensing time in accordance with the one or more respective perceptive identifiers based at least in part on receiving the first message; and transmitting the report indicating an identification associated with the one or more additional devices based at least in part on mapping the perceptive information to the identification associated with the one or more additional devices.

Aspect 14: The method of any of aspects 10 through 13, further comprising: determining the sensed location information associated with the one or more additional devices based at least in part on performing the sensing procedure, the sensed location information comprising occupancy information, wherein the occupancy information indicates an absence, a presence, perceptive information, or a combination thereof, of the one or more additional devices.

Aspect 15: The method of any of aspects 10 through 14, wherein the device is one of a UE, a base station, a network entity, or an RSU.

Aspect 16: A method for wireless communication at a server, comprising: receiving a first message indicating location information associated a first UE; transmitting a second message requesting sensed location information for verification of the location information associated with the first UE; and receiving a report indicating the sensed location information and a sensing time associated with the sensed location information.

Aspect 17: The method of aspect 16, further comprising: transmitting a first control message triggering a first operation status of one or more additional devices at a first time; and transmitting a second control message triggering a second operation status of the one or more additional devices at a second time.

Aspect 18: The method of any of aspects 16 through 17, further comprising: transmitting a configuration message indicating a mapping relationship between a bitmap parameter and one or more additional devices, wherein each bit of the bitmap parameter is associated with a respective device of the one or more additional devices.

Aspect 19: The method of aspect 18, wherein receiving the report indicating the sensed location information comprises: receiving the bitmap parameter, wherein each bit of the bitmap parameter indicates an operation status, a observability status, an identification, or both, of a respective device of the one or more additional devices.

Aspect 20: The method of any of aspects 16 through 19, wherein receiving the first message further comprises: receiving the first message indicating the location information associated with the first UE, the location information comprising first identification information, first positioning information, or both.

Aspect 21: The method of any of aspects 16 through 20, wherein transmitting the second message further comprises: transmitting the second message requesting the sensed location information, the sensed location information comprising occupancy information of one or more additional UEs.

Aspect 22: The method of aspect 21, wherein the occupancy information indicates an absence in a geographical zone, a presence in the geographical zone, perceptive information, or a combination thereof, of the one or more additional UEs.

Aspect 23: The method of any of aspects 16 through 22, further comprising: transmitting a configuration message indicating a geographical zone corresponding to a predefined area, one or more perceptive identifiers associated one or more additional UEs, or both.

Aspect 24: The method of any of aspects 16 through 22, further comprising: transmitting a configuration message indicating a set of one or more additional devices to be used for the verification of the location information associated with the first UE.

Aspect 25: The method of any of aspects 16 through 24, wherein the second message requests additional sensed location information associated with one or more additional UEs, and the report indicates the additional sensed location information.

Aspect 26: The method of any of aspects 16 through 25, further comprising: receiving an association message indicating that the sensed location information is associated with a second UE.

Aspect 27: The method of any of aspects 16 through 26, further comprising: transmitting a verification message indicating a reliability level of the location information based at least in part on the sensed location information satisfying a threshold.

Aspect 28: An apparatus for wireless communication at a first UE, comprising a processor; memory coupled with the processor; and instructions stored in the memory and executable by the processor to cause the apparatus to perform a method of any of aspects 1 through 9.

Aspect 29: An apparatus for wireless communication at a first UE, comprising at least one means for performing a method of any of aspects 1 through 9.

Aspect 30: A non-transitory computer-readable medium storing code for wireless communication at a first UE, the code comprising instructions executable by a processor to perform a method of any of aspects 1 through 9.

Aspect 31: An apparatus for wireless communication at a device, comprising a processor; memory coupled with the processor; and instructions stored in the memory and executable by the processor to cause the apparatus to perform a method of any of aspects 10 through 15.

Aspect 32: An apparatus for wireless communication at a device, comprising at least one means for performing a method of any of aspects 10 through 15.

Aspect 33: A non-transitory computer-readable medium storing code for wireless communication at a device, the code comprising instructions executable by a processor to perform a method of any of aspects 10 through 15.

Aspect 34: An apparatus for wireless communication at a server, comprising a processor; memory coupled with the processor; and instructions stored in the memory and executable by the processor to cause the apparatus to perform a method of any of aspects 16 through 27.

Aspect 35: An apparatus for wireless communication at a server, comprising at least one means for performing a method of any of aspects 16 through 27.

Aspect 36: A non-transitory computer-readable medium storing code for wireless communication at a server, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
transmitting a first message indicating location information associated with the first UE;
receiving a second message requesting sensed location information associated with the first UE for verification of the location information associated with the first UE;
transmitting a report indicating the sensed location information associated with the first UE and a sensing time associated with the sensed location information, wherein the sensed location information is based at least in part on a sensing procedure performed by the first UE at the sensing time; and
performing the sensing procedure to obtain the sensed location information based at least in part on monitoring for the sensed location information using one or more sensors at the first UE, wherein the monitoring for the sensed location information comprises:
receiving a configuration message indicating a set of one or more additional devices to be used for the verification of the location information associated with the first UE; and
monitoring a subset of the set of one or more additional devices based at least in part on a location of the first UE.

2. The method of claim 1, wherein monitoring for the sensed location information comprises:
receiving an identification indication associated with one or more additional devices, wherein the identification indication is received based at least in part on an operating status of the one or more additional devices.

3. The method of claim 1, further comprising:
receiving a configuration message indicating a mapping relationship between a bitmap parameter and one or more additional devices, wherein each bit of the bitmap parameter is associated with a respective device of the one or more additional devices.

4. The method of claim 3, wherein transmitting the report indicating the sensed location information comprises:
transmitting the bitmap parameter, wherein each bit of the bitmap parameter indicates an operation status, an observability status, an identification, or a combination thereof, of the respective device of the one or more additional devices.

5. The method of claim 1, further comprising:
determining the location information associated with the first UE, the location information comprising first identification information, first positioning information, or both; and
determining the sensed location information associated with the first UE based at least in part on performing the sensing procedure, the sensed location information comprising second identification information, second positioning information, or both.

6. The method of claim 1, wherein the second message requests additional sensed location information associated with one or more additional UEs, the method further comprising:
performing the sensing procedure to obtain the additional sensed location information, wherein the report indicates the additional sensed location information.

7. The method of claim 1, wherein the sensed location information is associated with a second UE.

8. A method for wireless communication at a device, comprising:
receiving a first message requesting sensed location information associated with one or more additional devices for verification of location information associated with the one or more additional devices;
transmitting a report indicating the sensed location information associated with the one or more additional devices and a sensing time associated with the sensed location information, wherein the sensed location information is based at least in part on a sensing procedure performed by the device at the sensing time; and
receiving a configuration message indicating a geographical zone corresponding to a predefined area, one or more respective perceptive identifiers associated with the one or more additional devices, or both.

9. The method of claim 8, further comprising:
monitoring for the one or more additional devices at the sensing time using one or more sensors at the device based at least in part on the geographical zone.

10. The method of claim 8, further comprising:
monitoring for perceptive information at the sensing time in accordance with the one or more respective perceptive identifiers based at least in part on receiving the first message; and
transmitting the report indicating an identification associated with the one or more additional devices based at least in part on mapping the perceptive information to the identification associated with the one or more additional devices.

11. The method of claim 8, further comprising:
determining the sensed location information associated with the one or more additional devices based at least in part on performing the sensing procedure, the sensed location information comprising occupancy information, wherein the occupancy information indicates an absence, a presence, perceptive information, or a combination thereof, of the one or more additional devices.

12. The method of claim 8, wherein the device is one of a user equipment (UE), a base station, a network entity, or a roadside unit.

13. A method for wireless communication at a server, comprising:
receiving a first message indicating location information associated with a first user equipment (UE);

transmitting a second message requesting sensed location information for verification of the location information associated with the first UE;

receiving a report indicating the sensed location information and a sensing time associated with the sensed location information; and transmitting a configuration message indicating a geographical zone corresponding to a predefined area, one or more perceptive identifiers associated one or more additional UEs, or both.

14. The method of claim 13, further comprising:

transmitting a first control message triggering a first operation status of one or more additional devices at a first time; and transmitting a second control message triggering a second operation status of the one or more additional devices at a second time.

15. The method of claim 13, further comprising:

transmitting a configuration message indicating a mapping relationship between a bitmap parameter and one or more additional devices, wherein each bit of the bitmap parameter is associated with a respective device of the one or more additional devices.

16. The method of claim 15, wherein receiving the report indicating the sensed location information comprises:

receiving the bitmap parameter, wherein each bit of the bitmap parameter indicates an operation status, a observability status, an identification, or both, of a respective device of the one or more additional devices.

17. The method of claim 13, wherein receiving the first message further comprises:

receiving the first message indicating the location information associated with the first UE, the location information comprising first identification information, first positioning information, or both.

18. The method of claim 13, wherein transmitting the second message further comprises:

transmitting the second message requesting the sensed location information, the sensed location information comprising occupancy information of one or more additional UEs.

19. The method of claim 18, wherein the occupancy information indicates an absence in a geographical zone, a presence in the geographical zone, perceptive information, or a combination thereof, of the one or more additional UEs.

20. The method of claim 13, further comprising:

transmitting a configuration message indicating a set of one or more additional devices to be used for the verification of the location information associated with the first UE.

21. The method of claim 13, wherein the second message requests additional sensed location information associated with one or more additional UEs, and the report indicates the additional sensed location information.

22. The method of claim 13, further comprising:

receiving an association message indicating that the sensed location information is associated with a second UE.

23. The method of claim 13, further comprising:

transmitting a verification message indicating a reliability level of the location information based at least in part on the sensed location information satisfying a threshold.

24. An apparatus for wireless communication at a first user equipment (UE), comprising:

one or more processors; and one or more memories coupled with the one or more processors and storing instructions executable by the one or more processors to cause the apparatus to:

transmit a first message indicating location information associated with the first UE;

receive a second message requesting sensed location information associated with the first UE for verification of the location information associated with the first UE; and transmit a report indicating the sensed location information associated with the first UE and a sensing time associated with the sensed location information, wherein the sensed location information is based at least in part on a sensing procedure performed by the first UE at the sensing time; and perform the sensing procedure to obtain the sensed location information based at least in part on monitor for the sensed location information using one or more sensors at the first UE, wherein the instructions to monitor for the sensed location information are executable by the one or more processors to cause the apparatus to:

receive a configuration message indicating a set of one or more additional devices to be used for the verification of the location information associated with the first UE; and monitor a subset of the set of one or more additional devices based at least in part on a location of the first UE.

25. The apparatus of claim 24, wherein the instructions to monitor for the sensed location information are executable by the one or more processors to cause the apparatus to:

receive an identification indication associated with one or more additional devices, wherein the identification indication is received based at least in part on an operating status of the one or more additional devices.

26. The apparatus of claim 24, wherein the one or more processors are further configured to:

receive a configuration message indicating a mapping relationship between a bitmap parameter and one or more additional devices, wherein each bit of the bitmap parameter is associated with a respective device of the one or more additional devices.

27. The apparatus of claim 26, wherein the instructions to transmit the report indicating the sensed location information are executable by the one or more processors to cause the apparatus to:

transmit the bitmap parameter, wherein each bit of the bitmap parameter indicates an operation status, an observability status, an identification, or a combination thereof, of the respective device of the one or more additional devices.

28. The apparatus of claim 24, wherein the one or more processors are further configured to:

determine the location information associated with the first UE, the location information comprising first identification information, first positioning information, or both; and determine the sensed location information associated with the first UE based at least in part on the perform the sensing procedure, the sensed location information comprising second identification information, second positioning information, or both.

29. The apparatus of claim 24, wherein the second message requests additional sensed location information associated with one or more additional UEs, the one or more processors are further configured to:

perform the sensing procedure to obtain the additional sensed location information, wherein the report indicates the additional sensed location information.

30. The apparatus of claim 24, wherein the sensed location information is associated with a second UE.

* * * * *